United States Patent
Yoshioka et al.

(10) Patent No.: US 9,403,423 B2
(45) Date of Patent: Aug. 2, 2016

(54) VEHICLE BODY STRUCTURE WITH DETACHABLE ROOF

(71) Applicant: HONDA MOTOR CO., LTD., Tokyo (JP)

(72) Inventors: Junichi Yoshioka, Wako (JP); Eiji Ishizuka, Wako (JP); Hiroyuki Inubushi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/872,329

(22) Filed: Oct. 1, 2015

(65) Prior Publication Data

US 2016/0096420 A1 Apr. 7, 2016

(30) Foreign Application Priority Data

Oct. 2, 2014 (JP) .................. 2014-204170
Oct. 2, 2014 (JP) .................. 2014-204201

(51) Int. Cl.
*B60J 7/12* (2006.01)
*B60J 7/10* (2006.01)
*B60J 10/10* (2006.01)

(52) U.S. Cl.
CPC ... *B60J 7/10* (2013.01); *B60J 10/10* (2013.01)

(58) Field of Classification Search
CPC .................. B60J 7/10; B60J 7/11; B60J 7/12; B60J 7/102; B60J 7/104
USPC ....................................................... 296/218
See application file for complete search history.

(56) References Cited

U.S. PATENT DOCUMENTS

| 2,062,177 | A | * | 11/1936 | Herron | B62D 25/06 296/210 |
| 5,009,465 | A | * | 4/1991 | Induni | B60J 7/1291 160/327 |
| 5,267,774 | A | * | 12/1993 | Garner | B60J 7/1226 296/218 |
| 7,770,958 | B2 | * | 8/2010 | Bunsmann | B60J 7/1291 296/121 |

FOREIGN PATENT DOCUMENTS

| DE | 4419869 | * | 6/1995 |
| EP | 2364869 | * | 12/2010 |
| JP | 5478673 B2 | | 4/2014 |
| WO | WO2014002570 | * | 1/2014 |

* cited by examiner

*Primary Examiner* — Dennis H Pedder
(74) *Attorney, Agent, or Firm* — Westerman, Hattori, Daniels & Adrian, LLP

(57) ABSTRACT

A detachable-roof-equipped vehicle body structure includes a seal member provided in a roof opening section, and a soft top constructed to abut against the seal member. The seal member includes first and second seal units, and the soft top includes a flexible sheet for covering the roof opening section and a reinforcing member of higher rigidity than the sheet. The reinforcing member is abutted, from above, against both of the first and second seal units. The structure also includes a connecting bag part secured to the sheet, left and right side rails attached to the sheet, and a wire member inserted through the bag part and extending between the side rails. The wire member includes a small-diameter portion, and large-diameter portion each provided on a position spaced from a corresponding one of the side rails.

13 Claims, 16 Drawing Sheets

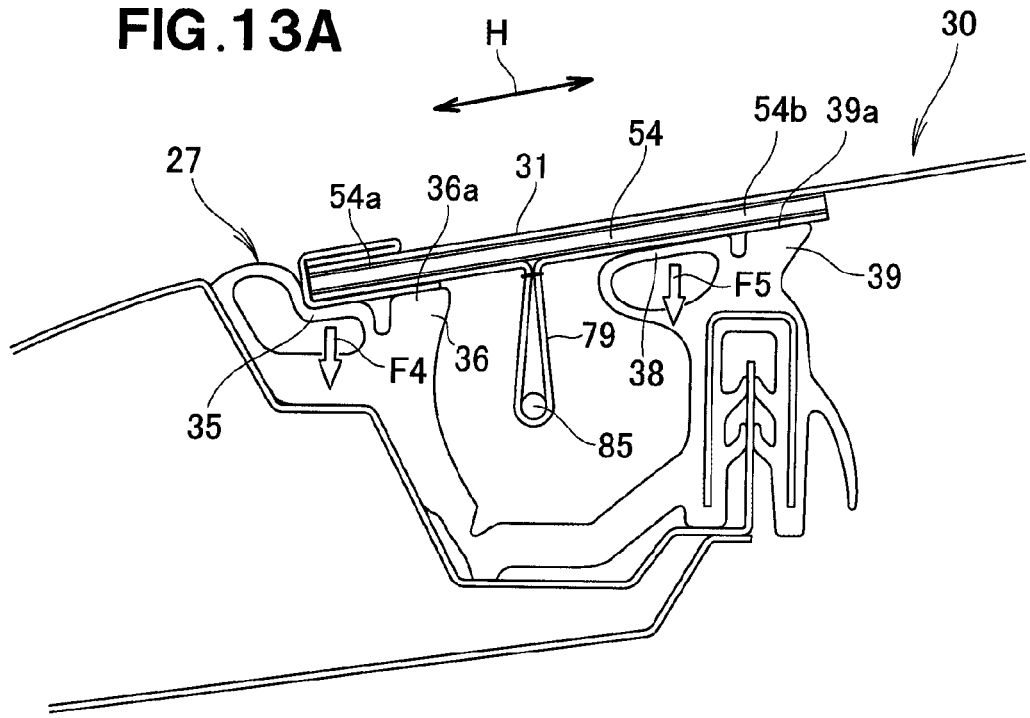
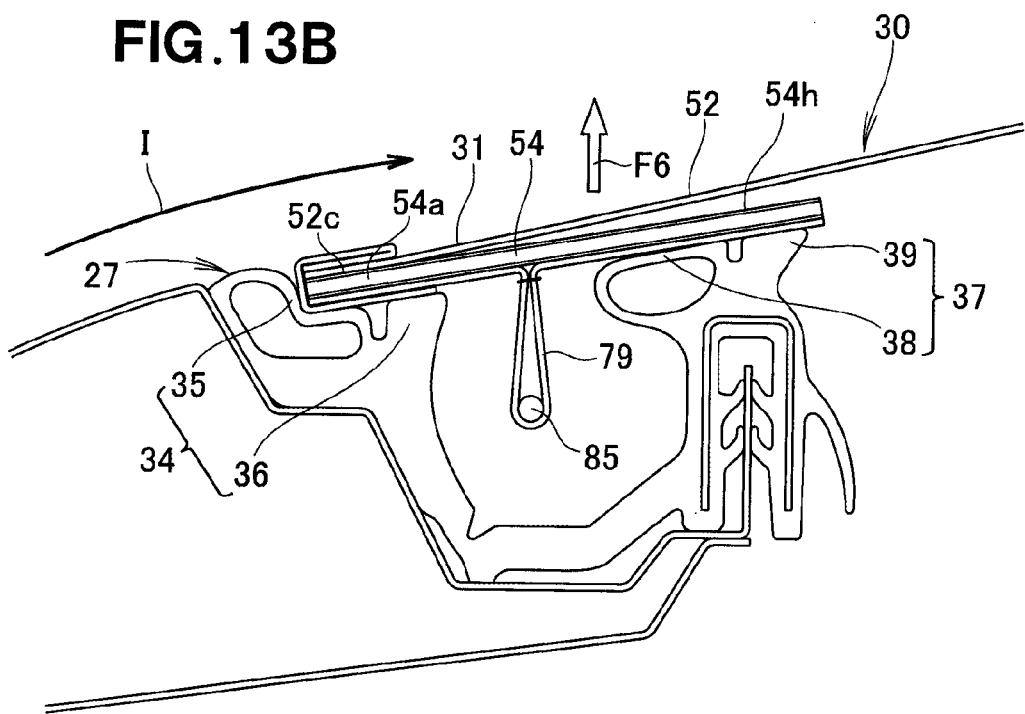

VEHICLE BODY STRUCTURE WITH DETACHABLE ROOF

FIELD OF THE INVENTION

The present invention relates to vehicle body structures with a detachable roof where a roof of the vehicle body has a roof opening section, and where a soft top is constructed to be detachably attached to the roof opening section for closing the roof opening section.

BACKGROUND OF THE INVENTION

Among the conventionally-known vehicle body structures with a detachable roof (hereinafter referred to also as "detachable-roof-equipped vehicle body structure") is one disclosed in Japanese Patent No. 5478673 (hereinafter referred to as Patent Literature 1"), where, with a detachable roof (hereinafter referred to as "soft top") detachably attached to a roof opening section provided in a roof of a vehicle body, a front end section (hereinafter referred to as "front pressed end section") of the soft top is abutted against a front seal member of the roof opening section while a rear end section (hereinafter referred to as "rear pressed end section") of the soft top is abutted against a rear seal member of the roof opening section. More specifically, a first seal section and a second seal section are disposed on the front seal member in such a manner that the first and second seal sections are spaced from each other in a front-rear direction of the vehicle body. Further, a lower sheet and a wire member are provided on the front pressed end section of the soft top, and the lower sheet is formed of flexible canvas. By the lower sheet being pulled downward by the wire member with the soft top attached to the roof opening section, the lower sheet is abutted against the first seal section in an oblique posture, so that tight sealing between the front pressed end section of the soft top and the front seal member can be secured. Tight sealing between the rear pressed end section of the soft top and the rear seal member can be secured in a similar manner.

In the detachable-roof-equipped vehicle body structure disclosed in Patent Literature 1, tight sealing between the front pressed end section of the soft top and the front seal section can be secured with the lower sheet abutted against the first seal section in an oblique posture. Thus, in order to secure the tight sealing between the front pressed end section of the soft top and the front seal member, it is preferable to increase pressing force of the lower sheet acting on the first seal section. However, because the lower sheet is formed of flexible canvas, it is difficult to increase the pressing force (secure sufficient pressing force) of the lower sheet on the first seal section, and the detachable-roof-equipped vehicle body structure disclosed in Patent Literature 1 has a room for improvement in this regard.

Further, in the detachable-roof-equipped vehicle body structure disclosed in Patent Literature 1, the lower sheet is abutted, from the front of the vehicle body, against the first seal section in an oblique posture. Thus, as the soft top moves, the lower sheet may undesirably move away from the first seal section. Therefore, when the soft top has moved, it is difficult to appropriately keep appropriate the pressing force of the lower sheet on the first seal section, and there is a room for improvement in this regard too.

Furthermore, in the detachable-roof-equipped vehicle body structure disclosed in Patent Literature 1, the wire member is mounted at its left and right end portions to left and right mounting members (hereinafter referred to as "left and right side rails"). The soft top is attached to the roof opening section by the left and right side rails being removably mounted on left and right side sections of the vehicle body. In this condition, the left and right end portions of the wire member are pulled by the left and right side rails, so that the wire member presses downward the lower sheet. By the lower sheet being depressed or pressed downward like this, the pressed end sections of the soft top abut against the first and second seal sections. Thus, the first and second seal sections are deformed so that the pressed end sections are supported by reactive force of the individual seal sections, with the result that tight sealing between the individual seal sections and the pressed end sections can be maintained.

In the detachable-roof-equipped vehicle body structure disclosed in Patent Literature 1, the soft top is constructed such that left and right end portions of the wire member are pulled by the left and right side rails and that the lower sheet is pressed downward by the thus-pulled wire member. Thus, in the neighborhood of the left and right side rails, pressing force of the wire member can be secured, and the lower sheet can be pressed downward in an appropriate manner. However, in a middle portion, in a vehicle width direction, of the wire member remote from the left and right side rails, it is difficult to secure sufficient pressing force of the wire member, and thus, measures have to be taken for the wire member to appropriately press downward the lower sheet. As such measures, it is conceivable to increase the outer diameter of the wire member so that sufficient pressing force can be secured throughout the entire range of the wire member. Namely, sufficient pressing force of the wire member can be secured even in the widthwise middle portion remote from the left and right side rails. However, if the outer diameter of the wire member is increased, it would become difficult to roll the wire member and thus it would take time and effort to fold the soft top when the soft top detached from the vehicle body is to be stored into a storage space.

SUMMARY OF THE INVENTION

In view of the foregoing prior art problems, it is one object of the present invention to provide an improved detachable-roof-equipped vehicle body structure which can not only secure tight sealing between the seal member and the soft top but also maintain the tight sealing between the seal member and the soft top even when the soft top has moved.

It is another object of the present invention to provide an improved detachable-roof-equipped vehicle body structure which can appropriately press downward the soft top by means of the wire member and allows the soft top to be folded with an increased ease.

In order to accomplish the above-mentioned objects, the present invention provides an improved detachable-roof-equipped vehicle body structure, which comprises: a roof opening section provided in a roof of a vehicle body; a soft top constructed to be detachably attached to the roof opening section for closing the roof opening section; a wire member provided on the soft top for pressing downward a depressed end section of the soft top along the roof opening section; and a seal member provided on an opening edge portion of the roof opening section for abutting against the depressed end section of the soft top, the seal member including a first seal section and a second seal section spaced from each other in a horizontal direction perpendicular to an extending direction of the wire member, the soft top including: a flexible sheet constructed to cover the roof opening section; a reinforcing member formed of a material of higher rigidity than the sheet and provided on a side of the sheet closer to a passenger compartment; and a connection section connecting the wire member to the reinforcing member, the reinforcing member being abutted, from above, against both of the first and second seals.

According to the present invention, the seal member is provided on the opening edge portion of the roof opening section, and the seal member includes the first and second seal sections. Further, the reinforcing member is abutted, from above, against both of the first and second seals, and the reinforcing member is formed of a material of higher rigidity than the sheet. Namely, the high-rigidity reinforcing member can be abutted against both of the first and second seals, and thus, it is possible to increase pressing force (biasing force) of the reinforcing member acting on the first and second seal sections. As a result, the present invention can secure tight sealing between the seal member and the reinforcing member (i.e., between the seal member and the soft top).

Further, because the high-rigidity reinforcing member is abutted against both of the first and second seals and because the wire member is connected to the reinforcing member so that the soft top is pressed downward by the reinforcing member. Thus, even when the soft top has moved (or has been displaced) in a horizontal direction (e.g., front-rear direction of the vehicle body and/or vehicle width direction), the front reinforcing member can be kept appropriately abutted against the first and second seal sections. Namely, it is possible to keep appropriate the pressing force of the reinforcing member on the first and second seal sections (i.e., the seal member). As a result, the present invention can maintain the tight sealing between the seal member and the reinforcing member even when the soft top has moved in the horizontal direction.

Preferably, in the detachable-roof-equipped vehicle body structure of the present invention, the reinforcing member includes a groove section formed therein to extend, along the above-mentioned horizontal direction where the first seal section and the second seal section are spaced from each other, from one end of the reinforcing member that is located adjacent to the first seal section to the other end of the reinforcing member that is located adjacent the second seal section. Thus, the reinforcing member can be bent at the groove section. In this way, the soft top can be folded compact, and the thus-folded soft top can be stored with an increased ease. Further, the groove section extends along the above-mentioned horizontal direction where the first seal section and the second seal section are spaced from each other, and thus, with the reinforcing member pressed downward by the wire member, the reinforcing member can be prevented from deforming along the groove section between the first and second seal sections, so that the pressing force of the wire member can be transmitted efficiently from the reinforcing member to each of the seal sections. As a result, the present invention can increase the pressing force of the reinforcing member on the first and second seal sections and thereby more reliably secure the tight sealing between the seal member and the reinforcing member.

Preferably, in the detachable-roof-equipped vehicle body structure of the present invention, the groove section includes an upper groove portion formed in the upper surface of the reinforcing member, and a lower groove portion formed in the lower surface of the reinforcing member. Thus, the reinforcing member can be bent in both of upward and downward directions at the upper and lower groove portions, so that it is possible to enhance operability in folding the soft top.

Preferably, in the detachable-roof-equipped vehicle body structure of the present invention, the upper groove portion and the lower groove portion are formed in positions of the reinforcing member that overlap each other vertically (i.e., in an up-down direction of the vehicle body). Thus, it is possible to reduce a groove depth (digging depth) of each of the upper and lower groove portions, so that the upper and lower groove portions can be easily formed by machining. By providing the upper groove portion and the lower groove portion in positions of the reinforcing member that vertically overlap each other like this, it is possible to minimize an area of the reinforcing member where the upper groove portion and the lower groove portion are to be formed and thus prevent reduction in the rigidity of the reinforcing member. As a result, the present invention allows the pressing force of the wire member to be transmitted more efficiently from the reinforcing member to the first and second seal sections.

Preferably, in the detachable-roof-equipped vehicle body structure of the present invention, the wire member is provided between the first seal section and the second seal section. Thus, it is possible to reduce distances between the first seal section and the wire member and between the second seal section and the wire member. As a result, the present invention allows the pressing force of the wire member to be transmitted even more efficiently from the reinforcing member to both of the first and second seal sections.

Note that it is sometimes conceivable to dispose the wire member outwardly of any one of the first and second seal sections. In such a case, the pressing force of the wire member acts on the reinforcing member as force that pivots the reinforcing member about the one seal section away from the other seal section, so that it would become difficult to keep appropriate the pressing force of the reinforcing member acting on the other seal section. This is why the wire member is provided between the first and second seal sections in the preferred implementation of the invention. With such an arrangement, the present invention allows the pressing force of the wire member to be transmitted efficiently from the reinforcing member to both of the first and second seal sections.

Preferably, in the detachable-roof-equipped vehicle body structure of the present invention, the connection section is connected to a substantial middle position, in the horizontal direction perpendicular to the extending direction of the wire member, of the reinforcing member. The pressing force of the wire member is transmitted to the substantial middle portion and then to the one end and the other end of the reinforcing member. As a result, the pressing force of the reinforcing member on the first and second seal sections can be secured substantially evenly.

Preferably, in the detachable-roof-equipped vehicle body structure of the present invention, the soft top includes: a connecting bag part provided on the sheet; and mounting members provided on opposite sides of the sheet and constructed to be mounted on the vehicle body. The wire member is inserted through the connecting bag part and extends between the mounting members, the wire member including at least two large-diameter portions each provided on a spaced position of the wire member that is spaced from one of the mounting members, each of the large-diameter portions having a larger diameter than a remaining portion of the wire member.

Each of the large-diameter portions is provided on the spaced position of the wire member that is spaced from one of the mounting members, and the large-diameter portion is greater in diameter than the remaining portion (small-diameter portion) of the wire member. Thus, with the soft top attached to the vehicle body, the large-diameter portion largely bulges downward beyond the small-diameter portion, so that the large-diameter portion is pressed strongly against a bottom portion of the connecting bag part. In this way, the sheet of the soft top can be pressed downward appropriately by the wire member (particularly, by the large-diameter portions). Thus, during travel of the vehicle, the soft top can be prevented from being undesirably lifted upward from the roof opening section, with the result that tight sealing of the sheet relative to the roof opening section can be secured. Further, because the large-diameter portions are each disposed only on the spaced position of the front wire member that is spaced from the mounting member, the remaining portion of the wire member (other than the large-diameter portions) can be formed as a small-diameter portion. The small-diameter portion, smaller in diameter than the large-diameter portion, is formed to be roll-folded with ease. Thus, operation for folding the wire member into a rolled configuration can be facilitated, with the result that the soft top can be folded with an increased ease.

Preferably, in the detachable-roof-equipped vehicle body structure of the present invention, the wire member includes a main wire having a substantially uniform cross section and cylindrical members having the main wire inserted therethrough, and the cylindrical members constitute the large-diameter portions. Because the wire member is formed of two elements, i.e. the main wire and the cylindrical members, any desired conventional wire can be used as the main wire. In this way, the wire member can be formed with ease and enhanced productivity.

Preferably, in the detachable-roof-equipped vehicle body structure of the present invention, the cylindrical member is formed of an elastic material. Because the cylindrical member is elastically deformable, it is possible to reduce a bending difficulty, i.e. increase bendability, of the wire member. Thus, with the small-diameter portion held in contact with the bottom portion of the connecting bag part, a lower end portion of the large-diameter portion contacts the bottom portion of the connecting bag part in an elastically deformed (i.e., compressed) state. Thus, the bottom portion of the connecting bag part can be pressed downward by the elasticity (i.e., restoring force from the compressed state) of the large-diameter portion in addition to the pressing force of the main wire. In this manner, the bottom portion of the connecting bag part can be pressed downward by great force, so that the sheet can be prevented from being lifted up from the roof opening section.

Preferably, in the detachable-roof-equipped vehicle body structure of the present invention, each of the cylindrical members having the main wire inserted therethrough is movable relative to the main wire. Thus, when the large-diameter portion is to be elastically deformed, the desired elastic deformation can be prevented from being hampered by the main wire. In this way, bendability (bending ease) of the wire member can be increased, which thereby allows the soft top to be folded with an increased ease.

Preferably, in the detachable-roof-equipped vehicle body structure of the present invention, the wire member further includes at least two pairs of fixed elements, each of the pairs of fixed elements being mounted immovably on the main wire adjacent to respective ones of opposite ends of a corresponding one of the cylindrical members in such a manner that the fixed elements are abuttable against the respective ones of opposite ends. Of each of the pairs, a distance between the fixed elements is greater than a length of the cylindrical member. By the fixed elements, the mounted position of the cylindrical member (i.e., large-diameter portion) can be limited, and lift-up of the soft top can be prevented. Further, because the pair of fixed elements is provided in such a manner that the distance between the fixed elements is greater than the length of the large-diameter portion, axial extension (thermal expansion) of the cylindrical member (i.e., large-diameter portion) is permitted without being hampered by the fixed elements. Furthermore, with the distance between the fixed elements greater than the length of the cylindrical member, elastic deformation of the cylindrical member is permitted without being hampered by the fixed elements. As a result, the present invention can achieve an enhanced bendability of the wire member and thereby allows the soft top to be folded with an increased ease.

Preferably, in the detachable-roof-equipped vehicle body structure of the present invention, the soft top further includes a reinforcing bar provided between the mounting members and extending in a direction crossing an extending direction of the wire member, and each of the large-diameter portions is disposed at the same position, in the extending direction of the wire member, as an end portion of the reinforcing bar. Thus, the soft top can be reinforced by the reinforcing bar. In this manner, the soft top can be prevented by the reinforcing bar from bending in the direction crossing the extending direction of the wire member, and the present invention can secure a sufficient rigidity and an enhanced stability of the soft top. However, when the soft top is to be folded, the position where the reinforcing bar is mounted would become a portion where the soft top is hard to fold. Therefore, in the present invention, the large-diameter portion is provided at the same position as the reinforcing bar that would become the hard-to-fold portion. Thus, it is possible to secure a wide easy-to-fold area outside the reinforcing bar. In this way, the soft top can be folded compact and thus can be stored with an increased efficiency.

Preferably, in the detachable-roof-equipped vehicle body structure of the present invention, the reinforcing bar is disposed in such a manner that a portion of thereof is located at a position overlapping the connecting bag part. Thus, with the bottom portion of the connecting bag part pressed downward, the pressing force of the large-diameter portion can be transmitted efficiently to the reinforcing bar. In this way, the reinforcing bar can be even more reliably pressed by the pressing force of the large-diameter portion toward the roof opening section, so that the stability of the soft top can be enhanced even further.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIGS. 13A and 13B are views explanatory of an example manner in which tight sealing between the front seal member and the soft top is secured by a front reinforcing member;

DETAILED DESCRIPTION OF THE INVENTION

Now, description will be given about an embodiment of a detachable-roof-equipped vehicle body structure of the present invention. In the following description, the terms "forward", "rearward", "left", "right", "upper", "lower", etc. are used to refer to directions as viewed from a human driver of a vehicle. The embodiment of the detachable-roof-equipped vehicle body structure 10 will be described in relation to a case where the detachable roof is a soft top 30.

Figure 1:
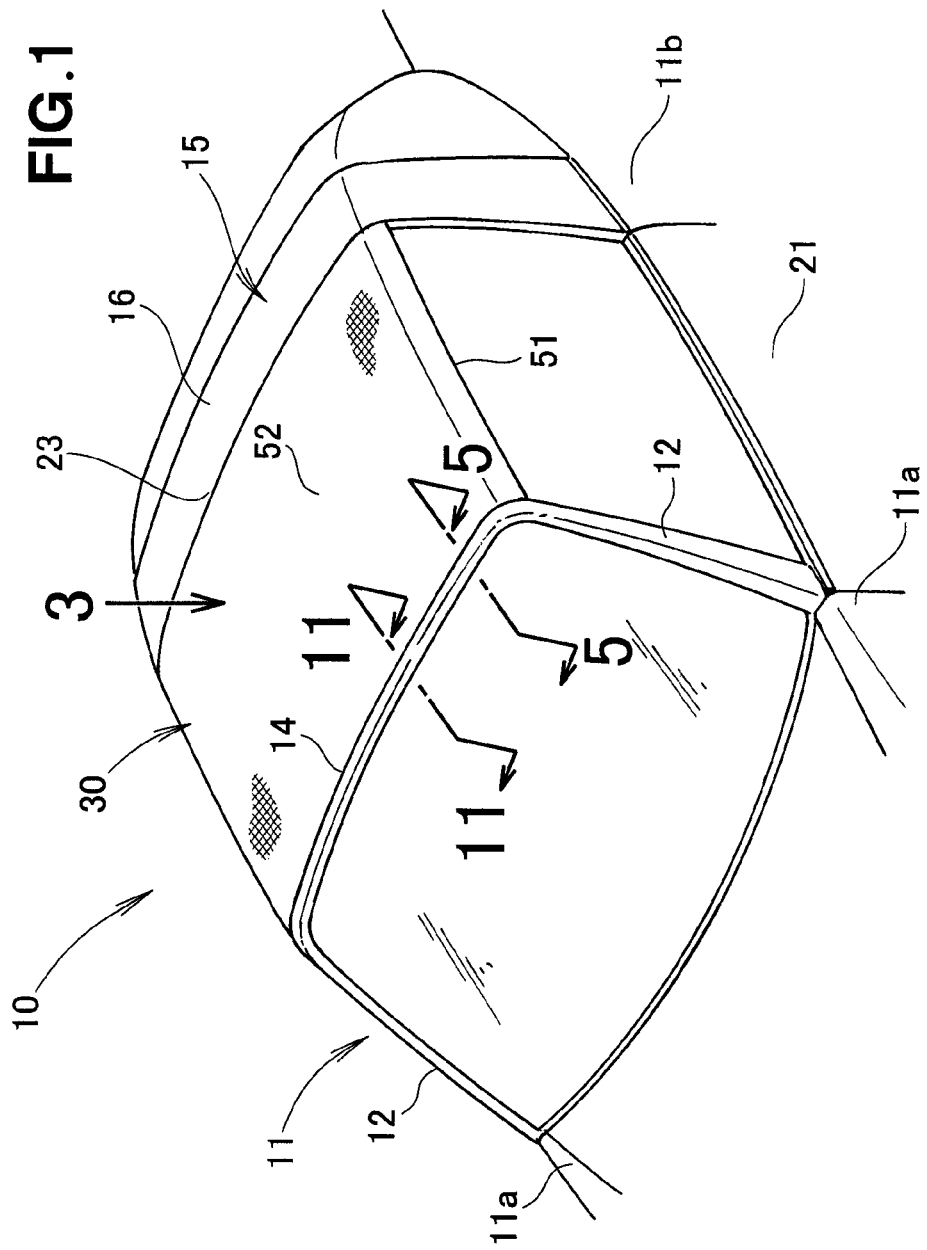
FIG. 1 is a perspective view showing an embodiment of a detachable-roof-equipped vehicle body structure of the present invention.
Figure 2:
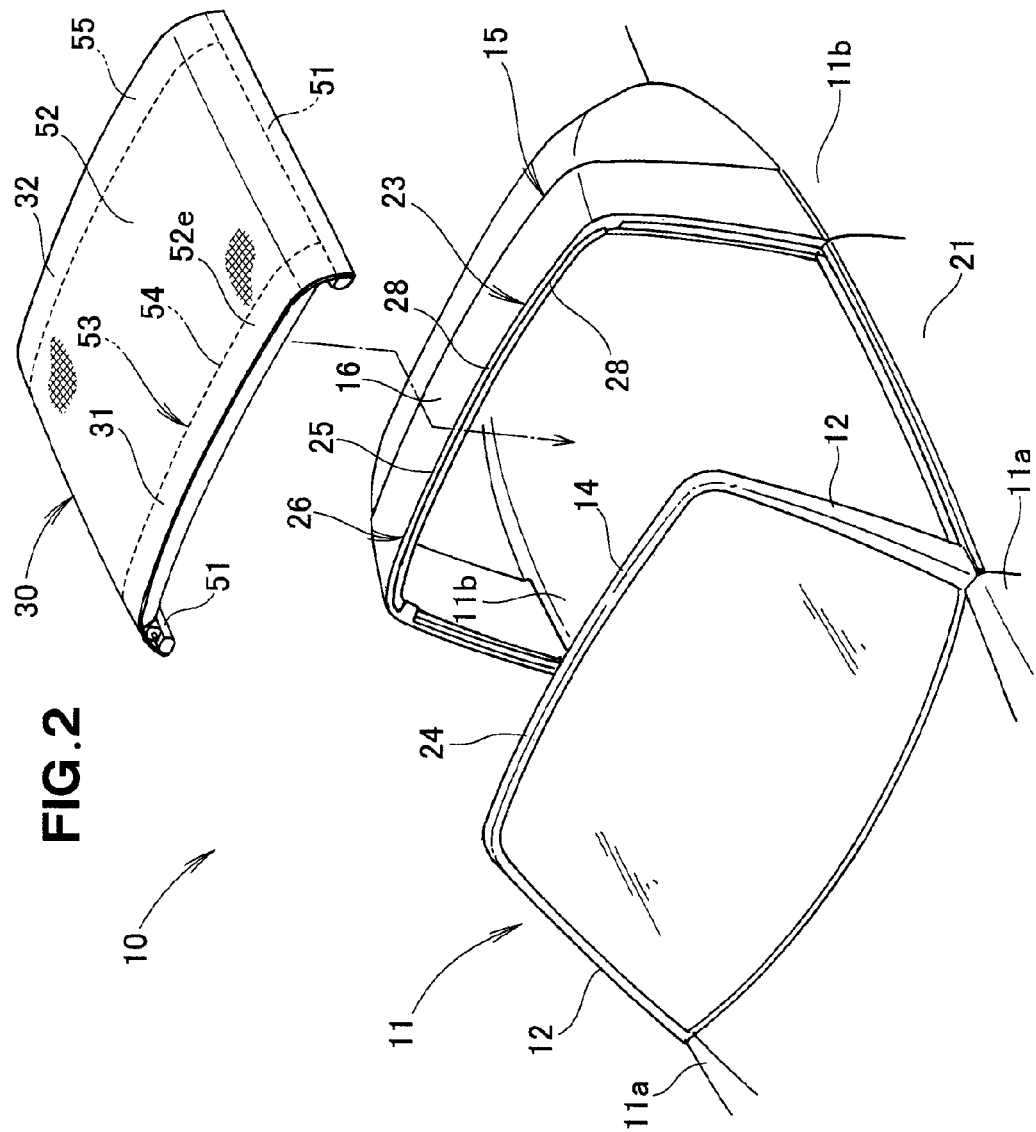
FIG. 2 is an exploded perspective view of the detachable-roof-equipped vehicle body structure of FIG. 1 with the detachable roof (soft top) detached therefrom.

As shown in FIGS. 1 and 2, the detachable-roof-equipped vehicle body structure 10 includes: left and right front pillars 12 extending obliquely rearward from front left and right side portions 11a of a vehicle body 11; a front roof rail 14 secured to and extending between the left and right front pillars 12; a roll bar 15 provided on rear left and right side portions 11b of the vehicle body 11; a left side door 21 provided between the left front pillar 12 and the roll bar 15; and a right side door 21 (see FIG. 3) provided between the right front pillar 12 and the roll bar 15.

The detachable-roof-equipped vehicle body structure 10 further includes: a roof opening section 23 formed in a roof of the vehicle body 11 by the front roof rail 14 and a rear roof rail 16 of the roll bar 15 spaced from the front roof rail 14 by a predetermined distance; a seal unit 26 provided on the roof opening section 23; and the soft top 30 detachably attached to the roof opening section 23. The roof opening section 23 has a front opening edge portion 24 formed on the front roof rail 14 and a rear opening edge portion 25 formed on the rear roof rail 16.

Figure 3:
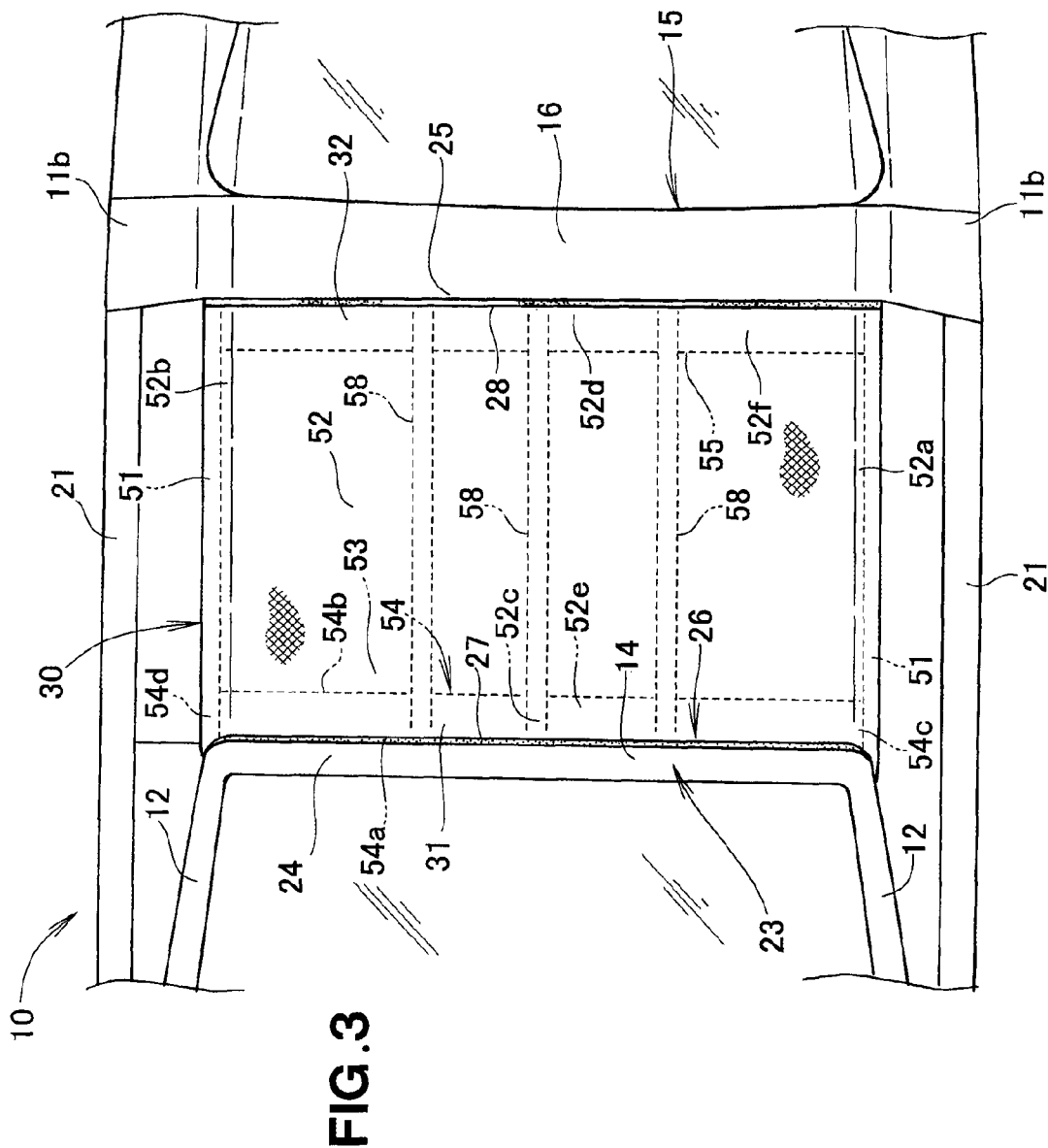
FIG. 3 is a view taken in a direction of arrow 3 in FIG. 1.
Figure 4:
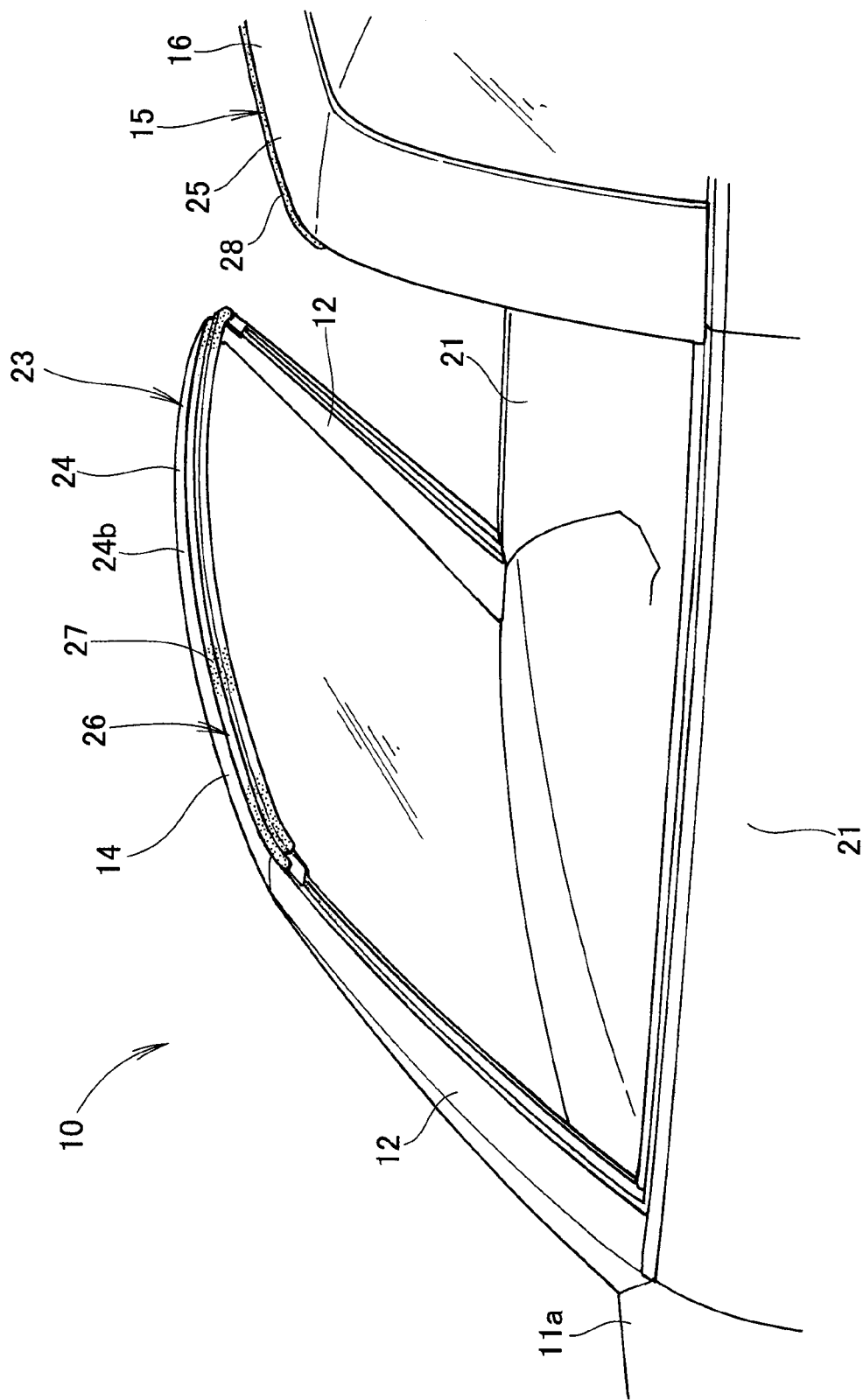
FIG. 4 is a rear perspective view of the detachable-roof-equipped vehicle body structure shown in FIG. 2.

As shown in FIGS. 3 and 4, the front opening edge portion 24 and the rear opening edge portion 25 extend in a vehicle width direction and are opposed to each other in a front-rear direction of the vehicle body (hereinafter "vehicle body front-rear direction"). The seal unit 26 is provided on the front opening edge portion 24 and the rear opening edge portion 25 of the roof opening section 23.

Figure 5:
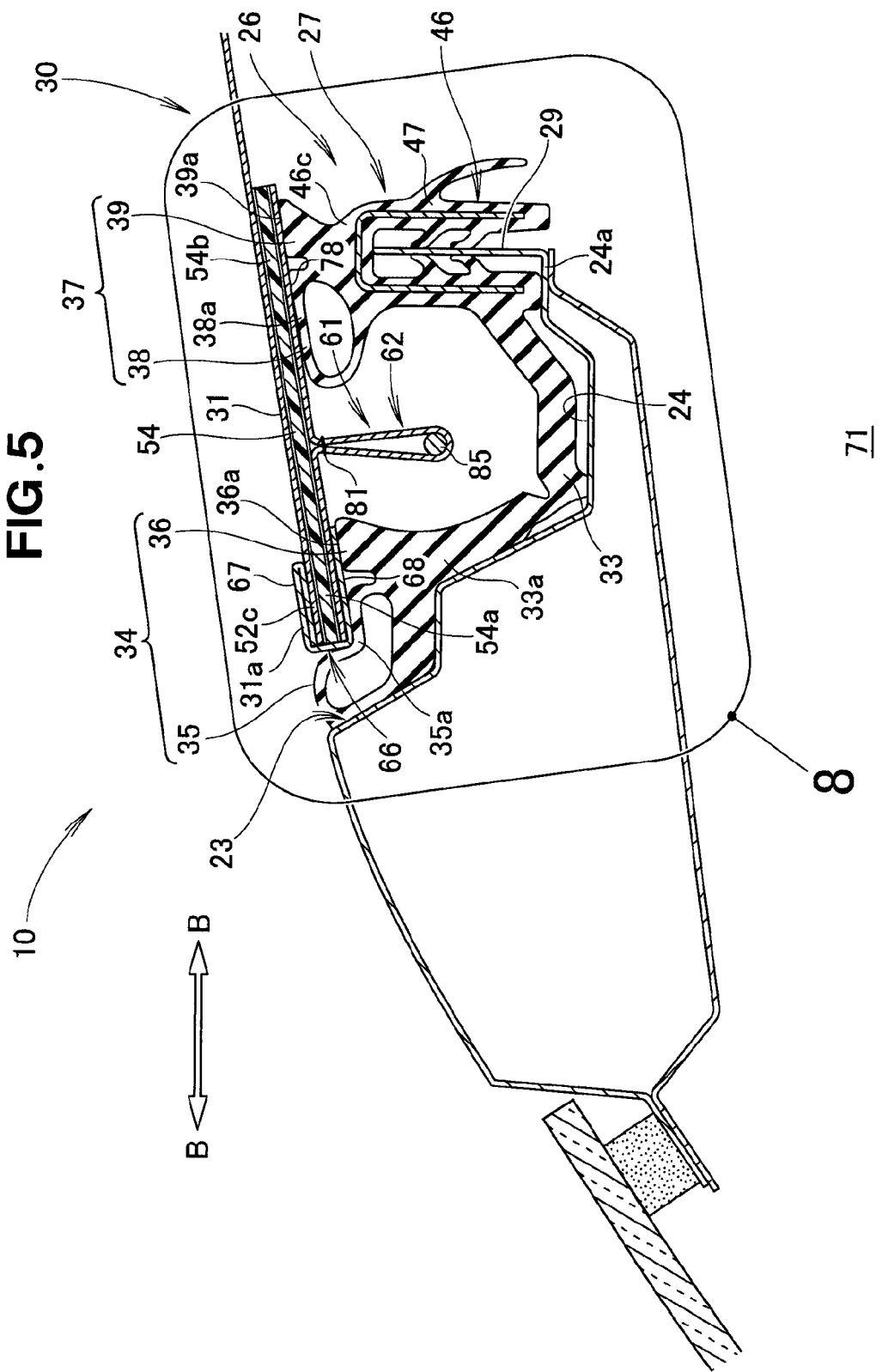
FIG. 5 is a sectional view taken along the line 5-5 in FIG. 1.

Further, as shown in FIG. 5, a flange 29 is provided on an inner end part 24a of the front opening edge portion 24 (i.e., inner end part of the roof opening section 23). The flange 29 is bent upward from the inner end part 24a of the front opening edge portion 24. Namely, the flange 29 is bent upward from the inner end part 24a of the front opening edge portion 24. A retention portion 46 of the seal unit 26 is supported on the flange 29.

Referring back to FIGS. 3 and 4, the seal unit 26 includes a front seal member 27 provided on the front opening edge portion 24, and a rear seal member 28 provided on the rear opening edge portion 25. The front seal member 27 abuts against a front pressed end section 31 of the soft top 30 to thereby secure tight sealing between the front seal member 27 and the front pressed end section 31. The front seal member 27 is provided along the front opening edge portion 24.

The rear seal member 28 abuts against a rear pressed end section 32 of the soft top 30 to thereby secure tight sealing between the rear seal member 28 and the rear pressed end section 32. Note that the rear seal member 28 is substantially symmetric with the front seal member 27 in the vehicle body front-rear direction and similar in construction and operation to the front seal member 27, and thus, the following mainly describe the front seal member 27 with a detailed description about the rear seal member 28 omitted to avoid unnecessary duplication.

Figure 6:
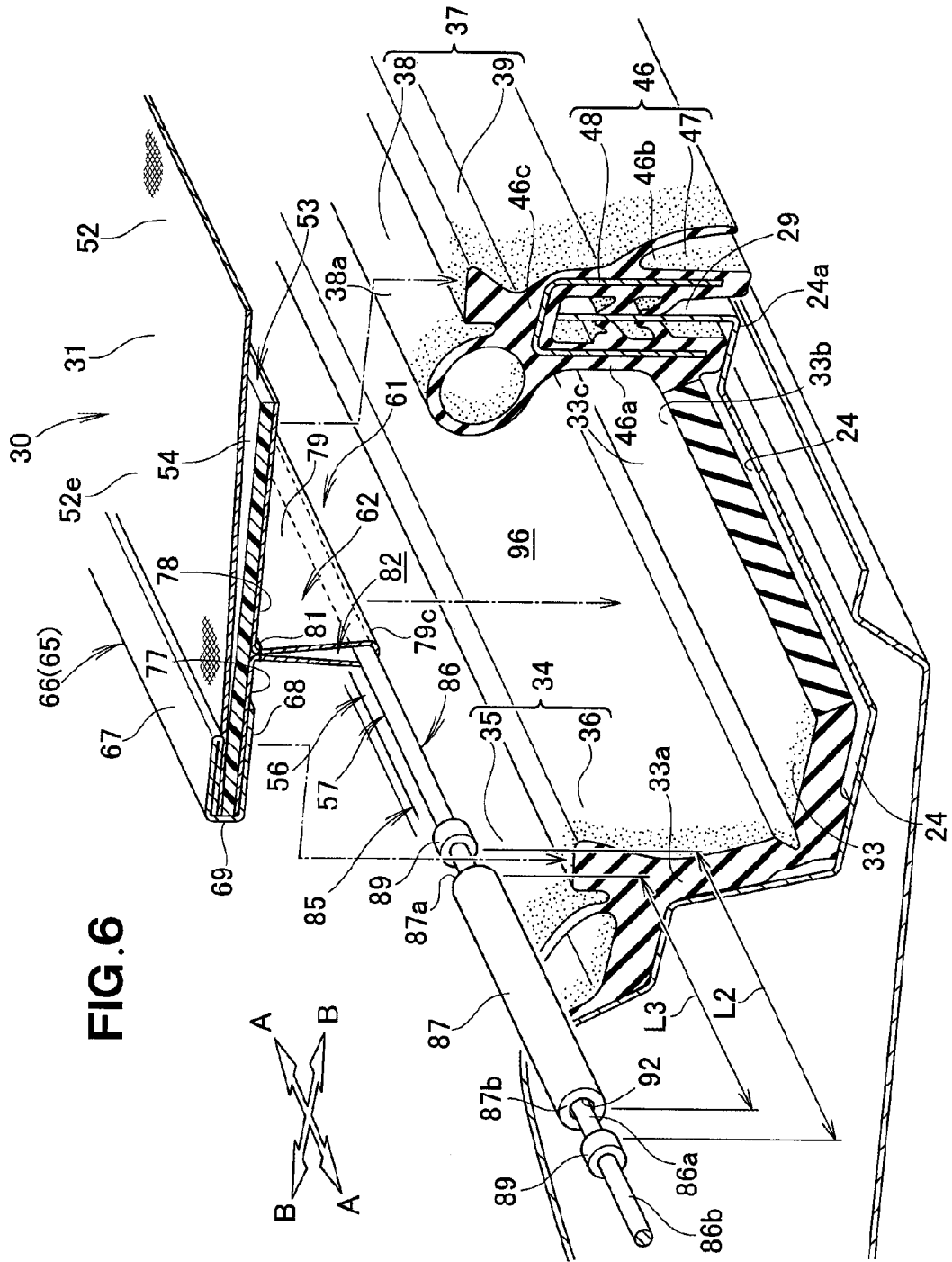
FIG. 6 is an exploded perspective view showing relationship between a front seal member and the soft top.

As shown in FIGS. 5 and 6, the front seal member 27 includes: a base section 33 mounted on the front opening edge portion 24; a first seal unit 34 provided on a front upper portion 33a of the base section 33; the retention section 46 provided on a rear portion 33b of the base section 33; and a second seal unit 37 provided on the retention section 46. The front seal member 27 has an opening portion between the first seal unit 34 and the second seal unit 37, and this opening portion is downwardly hollowed so that the front seal member 27 has a generally U sectional shape.

The first seal unit 34 and the second seal unit 37 are spaced from each other in a horizontal direction perpendicular to an extending direction of a front wire member 85 (to be described later) of the soft top 30. The extending direction of the front wire member 85 corresponds to the vehicle width direction and is indicated by arrow A-A in FIG. 6, and the horizontal direction perpendicular to the extending direction corresponds to the vehicle body front-rear direction and is indicated by arrow B-B in FIG. 6.

The base section 33 is disposed between, and integrally interconnects, respective bases of the first seal unit 34 and the second seal unit 37. The base of the first seal unit 34 is adhered to the front opening edge portion 24 by means of a double-faced adhesive tape.

Figure 7:
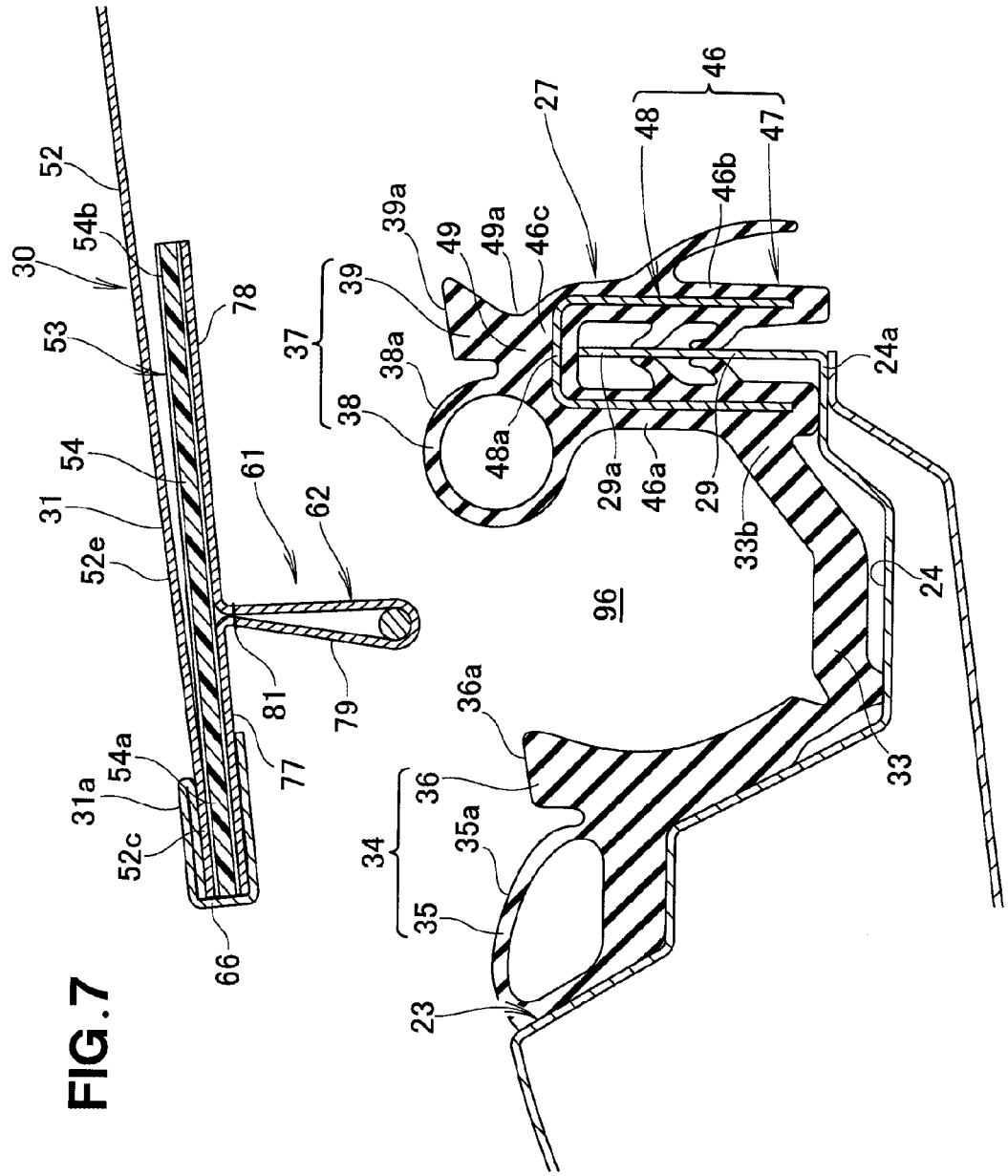
FIG. 7 is a sectional view showing the soft top detached upward from a front seal member of FIG. 5.

Further, as shown in FIGS. 5 and 7, the first seal unit 34 is provided on a front end portion of the base section 33. The first seal unit 34 includes a seal section (hereinafter "first seal section") 35 for securing tight sealing relative to the soft top 30, and a stopper section (hereinafter "first stopper") 36 provided adjacent to and rearwardly, in the vehicle body front-rear direction, of the first seal section 35. In other words, the first seal section 35 is provided adjacent to and forwardly, in the vehicle body front-rear direction, of the first stopper section 36.

The first seal section 35 is formed in a hollow shape and has an upper portion 35a located above the upper surface 36a of the first stopper section 36. A front edge portion 31a of the soft top 30 (more specifically, the front pressed end section 31) is abutted and pressed against the upper portion 35a of the first seal section 35 from a generally horizontal rearward direction, so that the upper portion 35a is deformed forwardly and downwardly to thereby secure tight sealing relative to the front edge portion 31a of the soft top 30.

The first stopper section 36, which is provided adjacent to and rearwardly of the first seal section 35, has the upper surface 36a located beneath the first seal section 35 (particularly, the upper portion 35a). The upper surface 36a of the first stopper section 36 slants downwardly toward the outside of the roof opening section 23 (i.e., toward the front of the vehicle body) and extends flat along the front edge portion 31a of the soft top 30. The front edge portion 31a of the soft top 30 is abutted against the upper surface 36a of the first stopper section 36 from a generally horizontal rearward direction and supported by the upper surface 36a at a predetermined height position.

The second seal unit 37 is provided at the top of the retention section 46. The second seal unit 37 includes a seal section (hereinafter "second seal section") 38 for securing tight sealing relative to the soft top 30, and a stopper section (hereinafter "second stopper section") 39 provided adjacent to and rearwardly, in the vehicle body front-rear direction, of the second seal section 38.

The second seal section 38 is provided more inside the roof opening section 23 (i.e., more rearward in the vehicle body front-rear direction) than the first seal section 35. Further, the second seal section 38, which is provided adjacent to and forward, in the vehicle body front-rear direction, of the second stopper section 39, is formed in a hollow shape like the first seal section 35, and has an upper portion 38a located above the upper surface 39a of the second stopper section 39. The front pressed end section 31 of the soft top 30 is abutted and pressed against the upper portion 38a of the second seal section 38 from a generally upper rearward direction, so that the upper portion 38a is deformed downwardly to thereby secure tight sealing relative to the front pressed end section 31.

The second stopper section 39, which is provided adjacent to and rearwardly of the second seal section 38, has the upper surface 39a located beneath the second seal section 38 (particularly, the upper portion 38a) and above the first stopper section 36. The upper surface 39a of the second stopper section 39 slants downwardly toward the outside of the roof opening section 23 and extends flat along the front pressed end section 31. The front pressed end section 31 of the soft top 30 is abutted against the upper surface 39a of the second stopper section 39 from above and supported by the upper surface 39a at a predetermined height position.

Namely, the front edge portion 31a of the front pressed end section 31 is abutted against the flat upper surface 36a of the first stopper section 36, and the front pressed end section 31 is abutted against the flat upper surface 39a of the second stopper section 39. Thus, the front pressed end section 31 is supported stably by both of the first stopper section 36 and the second stopper section 39 by virtue of the own weight of the soft top 30 and tension of the front wire member 85, and thus, even when flexure has occurred on a middle portion, in the vehicle width direction, of the soft top 30, the front pressed end section 31 can be prevented from being displaced to incline vertically or in an up-down direction of the vehicle body.

Because unwanted inclination of the front pressed end section 31 is prevented as above, it is possible to prevent the front pressed end section 31 from slanting relative to the first and second seal sections 35 and 38. In this way, it is possible to secure tight sealing between the first seal section 35 and the front pressed end section 31 and between the second seal section 38 and the front pressed end section 31. Namely, it is possible to secure tight sealing between the front seal member 27 and the front pressed end section 31.

Further, because the first stopper section 36 is provided adjacent to the first seal section 35 and the second stopper section 39 is provided adjacent to the second seal section 38 and because the front pressed end section 31 is supported by the first stopper section 36 and the second stopper section 39, it is possible to prevent flexure from occurring in portions of the front pressed end section 31 located on the first seal section 35 and the second seal section 38. In this way, the instant embodiment can ensure tight sealing between the first seal section 35 and the second seal section 38 (i.e., front seal member 27) and the front pressed end section 31 with an increased reliability.

Further, the second seal section 38 is disposed more inside the roof opening section 23, and the second stopper section 39 is disposed above the first stopper section 36. Besides, the second stopper section 39 is disposed more inside the roof opening section 23 than the first seal section 35. Thus, the front edge portion 31a of the front pressed end section 31 can be appropriately moved toward the first seal section 35 by the own weight of the soft top 30 and the tension of the front wire member 85. In this way, the instant embodiment can secure tight sealing between the first seal section 35 and the front edge portion 31a of the front pressed end section 31 with an increased reliability.

The upper surface 39a of the second stopper section 39 and the upper surface 36a of the first stopper section 36 are located flush with each other within an oblique plane. Namely, the upper surface 39a of the second stopper section 39 and the upper surface 36a of the first stopper section 36 each slant downwardly toward the outside of the roof opening section 23.

Thus, the front edge portion 31a of the front pressed end section 31 can be appropriately moved toward the first seal section 35 by the own weight of the soft top 30 and the tension of the front wire member 85. In this way, the instant embodiment can even more reliably secure tight sealing between the first seal section 35 and the front edge portion 31a of the front pressed end section 31. Particularly, because both of the upper surface 39a of the second stopper section 39 and the upper surface 36a of the first stopper section 36 are slanting surfaces, the front edge portion 31a of the front pressed end section 31 can be moved toward the first seal section 35 even more smoothly.

Figure 8:
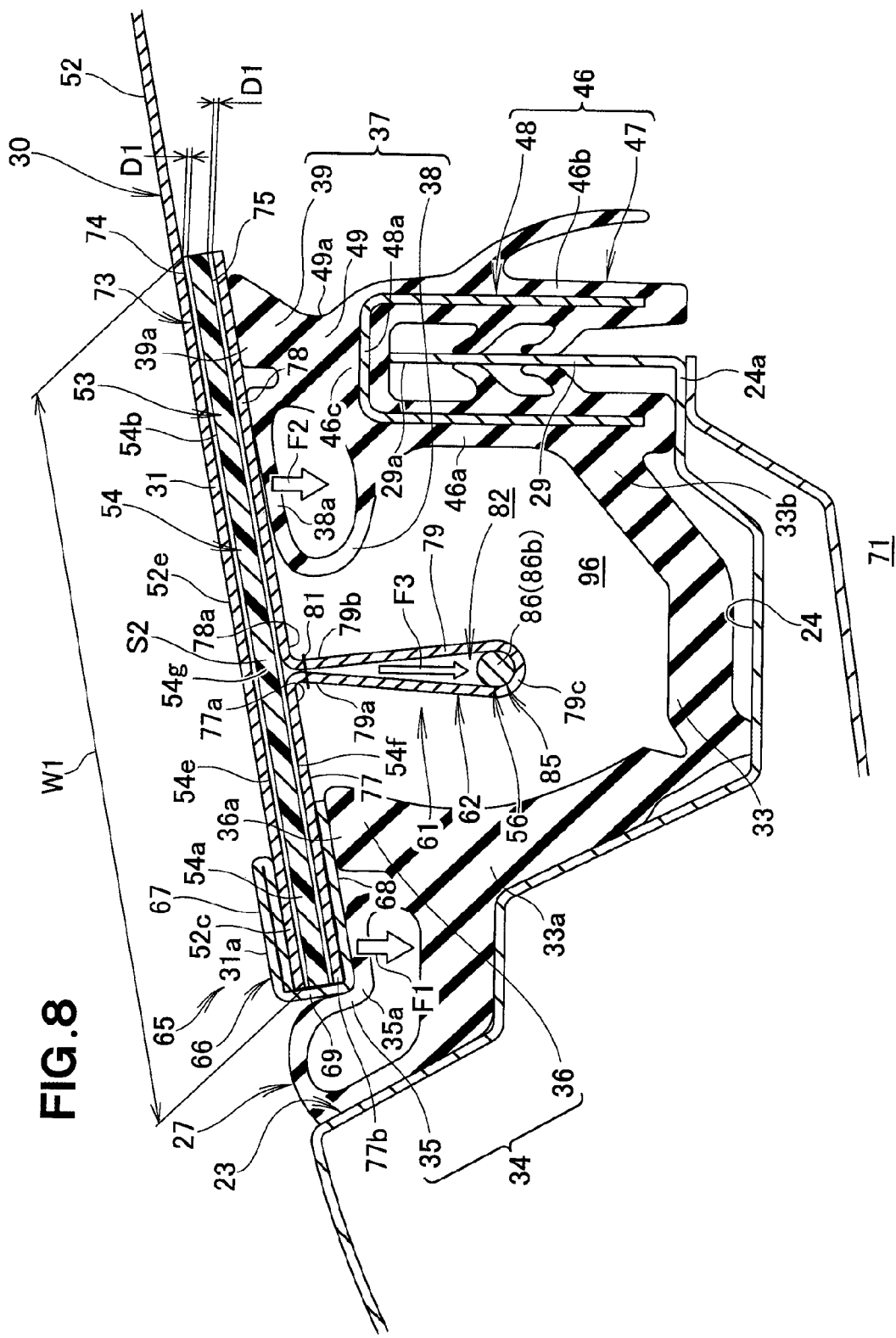
FIG. 8 is an enlarged view of a section surrounded at 8 in FIG. 5.

Further, as shown in FIGS. 6 and 8, the retention portion 46 of the seal unit 26 is provided on the rear portion 33b of the base section 33 and supported by the flange 29. The retention portion 46 has: a groove-shaped portion 47 formed of rubber and having the second seal unit 37 connected thereto; a metal core member 48 embedded in the groove-shaped portion 47; an outer wall 46a provided closer to the first seal unit 34; an inner wall 46b provided more inside the roof opening section 23 than the outer wall 46a; and a top section 46c interconnecting the respective upper ends of the outer wall 46a and inner wall 46b.

The retention portion 46 is formed in a downwardly-opening channel sectional shape (generally inverted-U sectional shape) with the outer wall 46a, the inner wall 46b and the top section 46c. The retention portion 46 is supported by the flange 29 that is inserted in the retention portion 46 through a lower-end opening portion of the retention portion 46.

Lower portions of the second seal section 38 and the second stopper section 39 are connected to the top section 46c of the retention portion 46, and thus, the second stopper section 39 is located above the flange 29. In this manner, a load acting from the soft top 30 on the second stopper section 39 can be borne by the flange 29, so that the soft top 30 can be reliably supported by the second stopper section 39.

Further, the distal end 29a of the flange 29 can be abutted against the top section 46c of the retention portion 46 by the flange 29 being inserted upward into the retention portion 46 through the opening portion of the retention portion 46. In this manner, a load acting from the soft top 30 on the second stopper section 39 can be borne by the flange 29, so that the soft top 30 can be supported even more reliably by the second stopper section 39.

The top section 46c and the second stopper section 39 are interconnected by a stopper connection 49. A recess 49a is formed in a rear portion of the stopper connection 49 above a top section 48a of the core member 48. By the recess 49a being formed in the stopper connection 49 like this, a region above the top section 46c (particularly, the top section 48a of the core member 48) can be recessed toward the front of the vehicle body. In this way, rigidity of the top section 46c can be appropriately lowered to allow the inner wall 46b to be easily deformed rearwardly as necessary, so that mountability of the retention section 46 on the flange 29 can be enhanced.

Referring back to FIGS. 1 and 2, the soft top 30 is detachably attached to the roof opening section 23. The roof opening section 23 is closed with the soft top 30 attached to the opening section 23. The roof opening section 23 can be kept open with the soft top 30 detached from the roof opening section 23. Namely, the soft top 30 is a flexible constructed to be roof detachably attachable to the roof opening section 23.

Further, as shown in FIGS. 2 and 6, the soft top 30 includes: left and right side rails (mounting members) 51 constituting left and right side frame sections of the soft top 30; a sheet 52 having the left and right side rails 51 attached thereto; a reinforcement unit 53 that reinforces the sheet 52; a press-down unit 56 that presses downward the sheet 52; a connection unit 61 that connects the press-down unit 56 to the reinforcement unit 53; and a bead unit 65 that covers the sheet 52, the reinforcement unit 53, etc. The front pressed end section 31 of the soft top 30 is slightly curved toward the front of the vehicle body to extend along the front opening edge portion 24 (see FIG. 3). The front pressed end section 31 includes: a front end portion 52e of the sheet 52; a front reinforcing member 54 of the reinforcement unit 53; front and rear joint portions 77 and 78 of the connection unit 61; and a front bead 66 of the bead unit 65.

The left side rail 51 is detachably mounted to and extends between a left end portion of the front roof rail 14 and a left end portion of the rear roof rail 16. Similarly, the right side rail 51 is detachably mounted to and extends between a right end portion of the front roof rail 14 and a right end portion of the rear roof rail 16. In the aforementioned manner, the soft top 30 is detachably attached to the roof opening section 23 with the left side rail 51 mounted to a left side portion of the sheet 52 and with the right side rail 51 mounted to a right side portion of the sheet 52. The sheet 52 is formed of flexible canvas and in a generally rectangular shape as viewed in plan.

Figure 9:
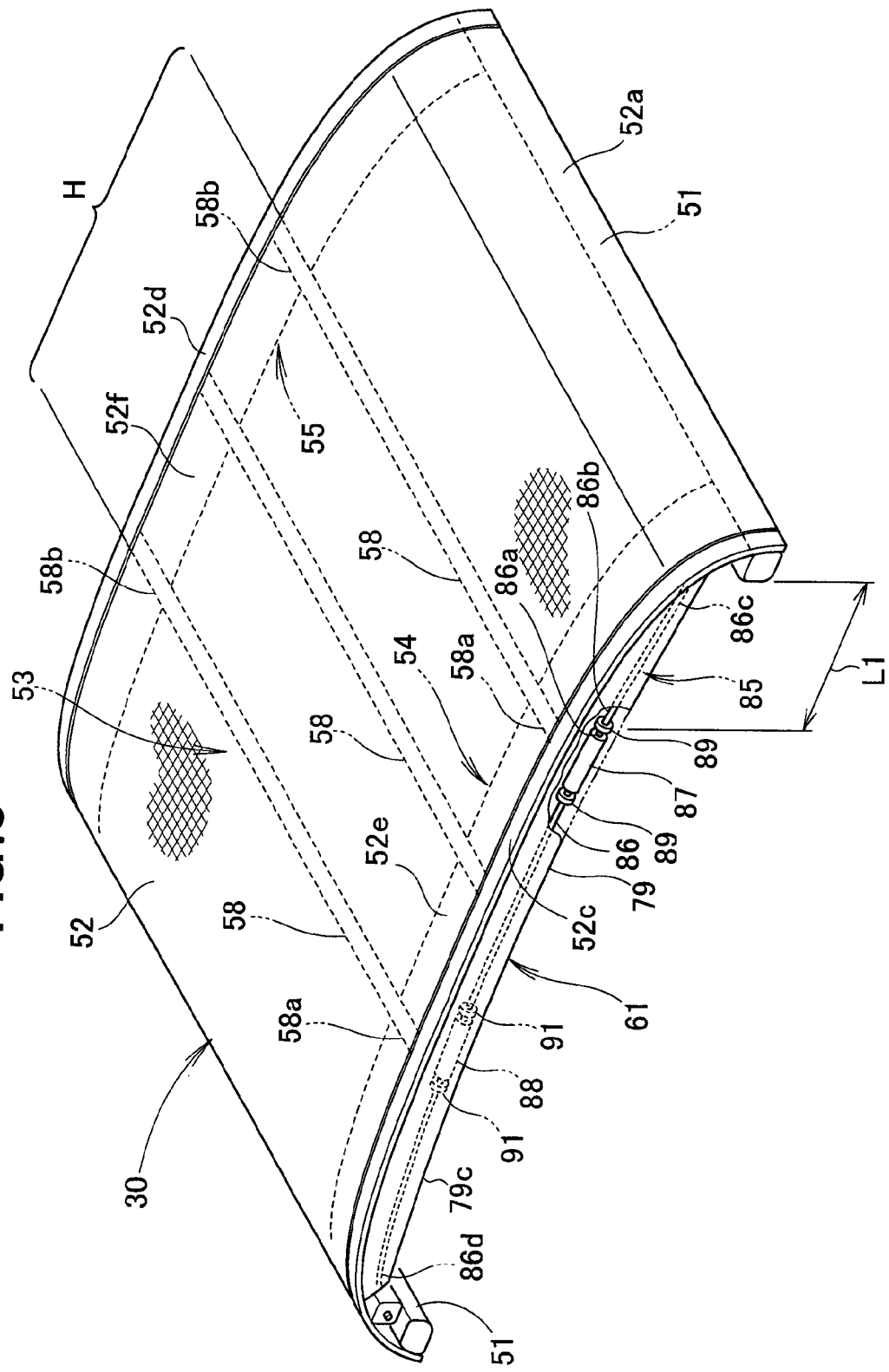
FIG. 9 is a perspective view of the soft top shown in FIG. 2.

More specifically, as shown in FIGS. 3 and 9, the sheet 52 has: a left edge portion 52a having the left side rail 51 mounted thereto; a right edge portion 52b having the right side rail 51 mounted thereto; a front edge portion 52c formed to be disposed along the front opening edge portion 24; and a rear edge portion 52d formed to be disposed along the rear opening edge portion 25.

The sheet 52 is formed in a generally rectangular shape with the left edge portion 52a, the right edge portion 52b, the front edge portion 52c and the rear edge portion 52d, and the roof opening section 23 is covered with such a rectangular sheet 52 from above. With the roof opening section 23 covered with the sheet 52 like this, the upper surface of the sheet 52 is exposed upwardly of the roof opening section 23.

The reinforcement unit 53 is joined to front and rear end portions 52e and 52f. The reinforcement unit 53 includes: the front reinforcing member 54 provided beneath the front end portion 52e of the sheet 52 to reinforce the front end portion 52e; a rear reinforcing member 55 provided beneath the rear end portion 52f of the sheet 52 to reinforce the rear end portion 52f; and a plurality of reinforcing bars 58 extending between the front and rear reinforcing members 54 and 55.

The front reinforcing member 54 is formed in a generally rectangular shape with its front end (one end) 54a, rear end (other end) 54b, left side end 54c and right side end 54d.

Figure 10:
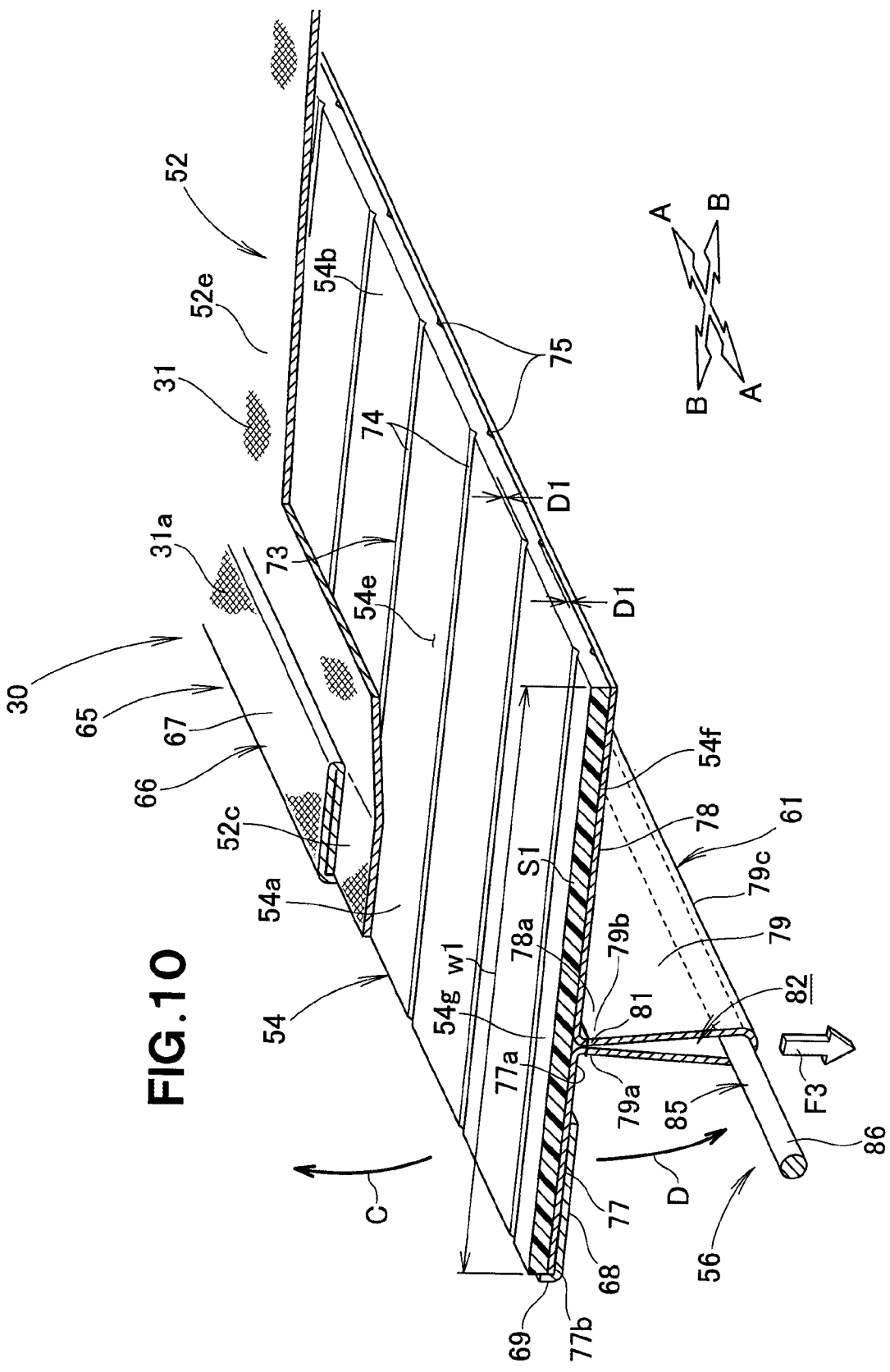
FIG. 10 is a perspective view of the soft top shown in FIG. 6.

As shown in FIGS. 8 and 10, the front reinforcing member 54 has a width dimension W1 in the vehicle body front-rear direction and is formed to be capable of abutting from above against both of the first seal unit 34 and the second seal unit 37. The front reinforcing member 54 is disposed on one side of the sheet 52 (more specifically, one side of the front end portion 52e) closer to a passenger compartment 71; the front reinforcing member 54 is superimposed on the one side of the front end portion 52e from the passenger compartment 71. In this condition, the front end 54a (more specifically, the upper surface of the front end 54a) of the front reinforcing member 54 is joined (sewn) to the front edge portion 52c of the sheet 52. Thus, the front end portion 52e (particularly, the front edge portion 52c) of the sheet 52 is reinforced with the front reinforcing member 54.

The front reinforcing member 54 is formed of a material, such as resin like polypropylene, higher in rigidity than the sheet 52 and in a plate shape and has a plurality of groove sections 73 formed therein at predetermined intervals in the vehicle width direction. Namely, the front reinforcing member 54 formed of a material higher in rigidity than the sheet 52 is abutted from above against both of the first seal unit 34 and the second seal unit 37.

Thus, the high-rigidity front reinforcing member 54 is abutted, from above, against the first stopper section 36 of the first seal unit 34 and the second stopper section 39 of the second seal unit 37. In this manner, the front reinforcing member 54 is supported stably by the first and second stopper sections 36 and 39, so that the front pressed end section 31 of the soft top 30 can be reliably prevented from being displaced to incline vertically or in the up-down direction. By thus preventing inclination of the front pressed end section 31, the instant embodiment can even more reliably secure tight sealing of the front pressed end section 31 relative to the front seal member 27 (i.e., first and second seal sections 35 and 38).

Further, the high-rigidity front reinforcing member 54 is abutted, from above, against the first seal section 35 of the first seal unit 34 and the second seal section 38 of the second seal unit 37. Thus, pressing force (biasing force) F1 acting from the front end 54a of the front reinforcing member 54 on the first seal section 35 and pressing force (biasing force) F2 acting from the rear end 54b of the front reinforcing member 54 on the second seal section 38 can be increased by the high-rigidity front reinforcing member 54. In this way, the instant embodiment can secure tight sealing between the first seal section 35 and the front end 54a and between the second seal section 38 and the rear end 54b, thereby securing tight sealing of the soft top 30 relative to the first seal section 35 and the second seal section 38.

Further, the groove sections 73 are formed at predetermined intervals in the vehicle width direction. The predetermined intervals may be any appropriate intervals chosen taking into account a shape of the front reinforcing member 54 etc. The groove sections 73 comprise upper groove portions (also referred to as "upper slits") 74 formed in the upper surface 54e of the front reinforcing member 54, and lower groove portions (also referred to as "lower slits") 75 formed in the lower surface 54f of the front reinforcing member 54. The upper groove portions 74 and the lower groove portions 75 are provided in positions of the front reinforcing member 54 that vertically overlap each other.

Each of the upper groove portions 74 is formed in a generally V sectional shape and extends straight along the upper surface 54e from the front end 54a of the front reinforcing member 54 to the rear end 54b of the front reinforcing member 54. The front end 54a of the front reinforcing member 54 is located adjacent to the first seal unit 34 of the front seal member 27, and the rear end 54b of the front reinforcing member 54 is located adjacent to the second seal unit 37 of the front seal member 27. Thus, the upper groove portion 74 extends along the direction where the first seal unit 34 and the second seal unit 37 of the front seal member 27 are spaced from each other (or along the direction where the first seal unit 34 and the second seal unit 37 are interconnected via the base section 33).

Each of the lower groove portions 75 is formed in a generally inverted-V sectional shape vertically symmetric with one of the upper groove portions 74 and extends straight along the lower surface 54f from the front end 54a of the front reinforcing member 54 to the rear end 54b of the front reinforcing member 54. Thus, like the upper groove portion 74, the lower groove portion 75 extends along the direction where the first seal unit 34 and second seal unit 37 of the front seal member 27 are spaced from each other (or along the direction where the first seal unit 34 and the second seal unit 37 are interconnected via the base section 33).

Because each of the upper groove portions 74 extends straight along the upper surface 54e from the front end 54a to the rear end 54b of the front reinforcing member 54 and each of the lower groove portions 75 extends straight along the lower surface 54f from the front end 54a to the rear end 54b of the front reinforcing member 54, and because the front reinforcing member 54 is formed of a material, such as resin like polypropylene, portions (trough portions) of the front reinforcing member 54 that have the upper and lower groove portions 74 and 75 are thin in thickness to be easily bendable. Thus, the front reinforcing member 54 are bendable at the upper and lower groove portions 74 and 75 both in an upward direction (direction of arrow C) and in a downward direction (direction of arrow D).

By bending the front reinforcing member 54 at the upper and lower groove portions 74 and 75, it is possible to roll-fold the front reinforcing member 54 (i.e., fold the front reinforcing member 54 in a rolled configuration) and thereby fold the soft top 30 into a compact size. Further, by bending the front reinforcing member 54 at the upper and lower groove portions 74 and 75 both in the upward direction (direction of arrow C) and in the downward direction (direction of arrow D), it is possible to enhance operability in folding the soft top 30 into a compact size.

Further, because the upper and lower groove portions 74 and 75 extend along the direction where the first stopper section 36 and the second stopper section 39 are spaced from each other (or interconnected via the base section 33), the front reinforcing member 54 has uniform sectional areas S1 and S2 in the direction where the first stopper section 36 and the second stopper section 39 are spaced from each other or the first stopper section 36 and the second stopper section 39 are interconnected via the base section 33.

More specifically, the sectional area S1 in each of portions of the front reinforcing member 54 where the upper and lower groove portions 74 and 75 are not formed is uniform in the direction where the first stopper section 36 and the second stopper section 39 are interconnected via the base section 33, as shown in FIG. 10. Further, the sectional area S2 in each of the portions of the front reinforcing member 54 where the upper and lower groove portions 74 and 75 are formed is also uniform in the direction where the first stopper section 36 and the second stopper section 39 are interconnected via the base section 33, as shown in FIG. 8. Namely, the front reinforcing member 54 has uniform mechanical strengths, corresponding to the sectional areas S1 and S2, in the direction where the first stopper section 36 and the second stopper section 39 are interconnected via the base section 33.

Further, the front reinforcing member 54 is supported at the front end 54a by the first stopper section 36 and supported at the rear end 54b by the second stopper section 39. Namely, the front reinforcing member 54 is supported at its opposite ends 54a and 54b by the first stopper section 36 and the second stopper section 39.

Thus, with the front reinforcing member 54 depressed or pressed downward by the front wire member 85 (to be described later) of the press-down unit 56, a substantial middle portion 54g of the front reinforcing member 54 can be prevented from deforming downward due to downward pressing force F3 of the front wire member 85. In this way, the front reinforcing member 54 can be prevented from deforming into a downward curved shape due to the downward pressing force F3 of the front wire member 85.

In other words, because the upper and lower groove portions 74 and 75 extend along the direction where the first seal unit 34 and the second seal unit 37 are spaced from each other or interconnected via the base section 33, the front reinforcing member 54 can be prevented from deforming between the first seal unit 34 and the second seal unit 37 along the upper and lower groove portions 74 and 75 due to the downward pressing force of the front wire member 85. By thus preventing deformation of the front reinforcing member 54, the instant embodiment allows the downward pressing force F3 of the front wire member 85 to be transmitted efficiently from the front reinforcing member 54 to the first seal section 35 and the second seal section 38.

In the aforementioned manner, it is possible to increase the pressing force F1 acting from the front reinforcing member 54 on the first seal section 35 and the pressing force F2 acting from the front reinforcing member 54 on the second seal section 38. Thus, the instant embodiment can secure tight sealing between the first seal section 35 and the front end 54a of the front reinforcing member 54 and between the second seal section 38 and the rear end 54b of the front reinforcing member 54, thereby securing tight sealing of the soft top 30 relative to the first seal section 35 and the second seal section 38.

The upper groove portions 74 and the lower groove portions 75 are provided in positions of the front reinforcing member 54 that vertically overlap each other. In this manner, it is possible to minimize an area on the upper surface 54a of the front reinforcing member 54 where the upper groove portions 74 have to be formed, as well as an area on the lower surface 54f of the front reinforcing member 54 where the lower groove portions 75 have to be formed. Therefore, it is possible to minimize reduction in the rigidity of the front reinforcing member 54, so that the pressing force F3 of the front wire member 85 can be transmitted efficiently from the front reinforcing member 54 to the first seal unit 34 (more specifically, the first seal section 35) and the second seal unit 37 (more specifically, the second seal section 38). As a result, the instant embodiment can more reliably secure tight sealing of the soft top 30 relative to the first seal section 35 and the second seal section 38.

Furthermore, because the upper groove portions 74 and the lower groove portions 75 are provided in positions vertically overlapping each other, the upper groove portions 74 and the lower groove portions 75 each have a reduced groove depth (digging depth) D1. Thus, the upper groove portions 74 and the lower groove portions 75 can be readily formed by machining, which can achieve an enhanced productivity of the front reinforcing member 54.

In addition, because the upper groove portions 74 and the lower groove portions 75 are formed in the front reinforcing member 54 to make the front reinforcing member 54 bendable, the front reinforcing member 54 can be formed of a single plate material. Thus, the instant embodiment can eliminate a trouble of, in order to make the front reinforcing member 54 bendable, dividing the front reinforcing member 54 into pieces and sewing the divided pieces of the front reinforcing members 54 to the front end portion 52e of the sheet 52 one by one. In this way, handling and mounting operation of the front reinforcing member 54 can be facilitated, so that the productivity of the front reinforcing members 54 can be enhanced even further.

Further, as shown in FIG. 9, the rear reinforcing member 55 is formed in a generally rectangular shape similarly to the aforementioned front reinforcing member 54. Because the rear reinforcing member 55 is symmetric with the front reinforcing member 54 in the front-rear direction and similar in construction and operation to the front reinforcing member 54, and thus, a detailed description about the rear reinforcing member 55 will be omitted to avoid unnecessary duplication. The connection units 61 (see FIGS. 8 and 10) are provided for the front reinforcing member 54 and the rear reinforcing member 55.

The plurality of reinforcing bars 58 are secured to and extend between the front and rear reinforcing members 54 and 55. The reinforcing bars 58 include a middle reinforcing bar 58 provided on a middle region, in the vehicle width direction, of the reinforcement unit 53, a left reinforcing bar 58 provided leftward, in the vehicle width direction, of the middle reinforcing bar 58, and a right reinforcing bar 58 provided rightward, in the vehicle width direction, of the middle reinforcing bar 58.

The plurality of reinforcing bars 58, each of which has high rigidity, are provided in a middle region H, in the vehicle width direction, between the left and right side rails 51 and extend in the direction of arrow B-B that is a direction crossing (more specifically, intersecting at right angles) the extending direction of the front wire member 85.

With the plurality of reinforcing bars 58, the soft top 30 is reinforced in the B-B direction. Thus, the soft top 30 can be prevented by the plurality of reinforcing bars 58 from bending in the B-B direction. In this way, the instant embodiment can secure a sufficient rigidity and an enhanced stability of the soft top 30.

Furthermore, the plurality of reinforcing bars 58 each have a front end portion 58a vertically overlapping a rear connection section 62 of the connection unit 61, and a rear end portion 58b vertically overlapping a rear connection section (not shown) of the connection unit 61. Particularly, the front end portion 58a of each of the reinforcing bars 58 is located at a position vertically overlapping a connection bag part 79 of the front connection section 62, and the rear end portion 58b of each of the reinforcing bars 58 is located at a position vertically overlapping a connection bag part of the rear connection section. The reason why the front end portion 58a of each of the reinforcing bars 58 is located at a position vertically overlapping the connecting bag part 79 of the front connection section 62 and the rear end portion 58b of each of the reinforcing bars 58 is located at a position vertically overlapping the connection bag part of the rear connection section will be detailed later.

As shown in FIGS. 8 and 10, the connection unit 61 includes the front connection section 62 joined to the lower surface 54f of the front reinforcing member 54, and the rear connection section (not shown) joined to the lower surface 54f of the rear reinforcing member 55.

The front connection section 62 integrally includes a front joint portion 77 joined (sewn) to a front half portion of the lower surface 54f, a rear joint portion 78 joined (sewn) to a rear half portion of the lower surface 54f, and the connecting bag part 79 connected to the rear end 77a of the front joint section 77 and the front end 78a of the rear joint portion 78. The front connection section 62 is lapped, from the passenger compartment 71, on the front end portion 52e of the sheet 52 via the front reinforcing member 54, and the front connection section 62 is formed of flexible canvas similarly to the aforementioned sheet 52.

The front joint section 77 is joined to and along the front half portion of the front reinforcing member 54 (more specifically, the lower surface 54f) by being lapped, from the passenger compartment 71, on the front half portion of the front reinforcing member 54 and then joined to the front half portion. The front joint section 77 has its front end 77b formed along the front opening edge portion 24, similarly to the front edge portion 52c of the sheet 52 and the front end 54a of the front reinforcing member 54. Further, the rear joint section 78 is joined to and along the rear half portion of the front reinforcing member 54 (more specifically, the lower surface 54f) by being lapped, from the passenger compartment 71, on the rear half portion of the front reinforcing member 54 and then joined to the rear half portion.

The connecting bag part 79 is formed in a bag-like sectional shape by its sewing portion 81 being sewn with a front upper end portion 79a and a rear upper end portion 79b superimposed with each other in the vehicle body front-rear direction. The front upper end portion 79a is connected to the rear end 77a of the front joint section 77, while the rear upper end portion 79b is connected to the front end 78a of the rear joint section 78.

The sewing portion 81 sewn in the aforementioned manner is connected to the substantial middle portion 54g of the front reinforcing member 54. The substantial middle portion 54g is located in a substantially middle region, in the direction of arrow B-B perpendicularly intersecting the extending direction (direction of arrow A-A) of the press-down unit 56 (more specifically, the front wire member 85).

Thus, the connection bag part 79 hangs down from a portion of the lower surface 54f located at the substantial middle portion 54g of the front reinforcing member 54. In this condition, the connection bag part 79 is supported by the lower surface 54f via the front and rear joint sections 77 and 78. With the connection bag part 79 formed in a bag-like sectional shape as noted above, a space is formed in the interior 82 of the connection bag part 79, and the front wire member 85 is accommodated in the interior space. Namely, the front wire member 85 is connected to the substantial middle portion 54g of the front reinforcing member 54 via the connection bag part 79.

The rear connection section (not shown) of the connection unit 61 is substantially symmetric with the front connection section 62 in the front-rear direction and similar in construction and operation to the front connection section 62, and thus, a detailed description about the rear connection section will be omitted to avoid unnecessary duplication.

The front edge portion 52c of the sheet 52, the front end 54a of the front reinforcing member 54 and the front half portion (more specifically, the front joint portion 77) of the front connection section 62 are covered with the front bead 66 of the bead unit 65. Further, the rear edge portion 52d (FIG. 3) of the sheet 52, the rear end of the rear reinforcing member 55 and the rear half portion of the rear connection section (more specifically, the rear joint portion) are covered with a rear front bead (not shown) of the bead unit 65.

Referring back to FIGS. 8 and 10, the front bead 66 includes an upper bead portion 67 covering from above the front edge portion 52c of the sheet 52, a lower bead portion 68 covering from the passenger compartment 71 the front half portion (including the front end 77b) of the front joint portion 77, and a front bead portion 69 interconnecting the front end of the upper bead portion 67 and the front end of the lower bead portion 68.

Like the front connection section 62 and the sheet 52, the front bead 66 is formed of flexible canvas. Further, the not-shown rear bead is substantially symmetric with the front bead 66 in the front-rear direction, and thus, a detailed description about the rear bead will be omitted to avoid unnecessary duplication.

Further, the press-down unit 56 is accommodated in the connection unit 61 (i.e., the connecting bag part 79 of the front connection section 62 and a not-shown connecting bag part of the rear connection section). The press-down unit 56 includes the front wire member 85 accommodated in the connecting bag part 79 of the front connection section 62, and a rear wire member (not shown) accommodated in the connecting bag part of rear front connection section.

Further, as shown in FIGS. 6 and 9, the front wire member 85 includes: a main wire 86 of a uniform circular cross section; left and right cylindrical members 87 and 88 each having a greater diameter than the main wire 86; a pair of left fixed elements 89 provided at the opposite ends of the left cylindrical member 87; and a pair of right fixed elements 91 provided at the opposite ends of the right cylindrical member 88.

The right cylindrical member 88 and the right fixed elements 91 are symmetric with each other in the left-right direction, and thus, a detailed description about the right cylindrical member 88 and the right fixed elements 91 will be omitted to avoid unnecessary duplication.

The main wire 86 is secured to and extends between the left and right side rails 51 and inserted through the interior 82 of the connecting bag part 79. Like the conventionally-known wires, the main wire 86 has a substantially uniform cross section and is formed of an elastically deformable material. Thus, any desired one of the conventionally-known wires may be used as the main wire 86. As the front reinforcing member 54 (i.e., the soft top 30) is folded in a rolled configuration (i.e., roll-folded), the main wire 86 can be roll-folded together with the front reinforcing member 54.

The left cylindrical member 87 is disposed on a spaced position 86a of the main wire 86 that is spaced inward, in the vehicle width direction, by a distance L1 from the left side rail 51. Namely, the main wire 86 includes the spaced position 86a spaced inward, in the vehicle width direction, by the distance L1 from the left side rail 51, and another portion 86b than the spaced position 86a. The other portion 86b of the main wire 86 will be referred to as "small-diameter portion 86b".

The left cylindrical member 87 is formed of an elastic material in a cylindrical shape having a greater diameter than the main wire 86, and the left cylindrical member 87 has a hole 92 formed axially therethrough. The left cylindrical member 87 is provided as a large-diameter portion of the front wire member 85. Thus, the left cylindrical member 87 will hereinafter be referred to as "large-diameter portion 87".

The through-hole 92 of the large-diameter portion 87 has an inner diameter than the outer diameter of the main wire 86. Thus, with the main wire 86 inserted through the through-hole 92 of the large-diameter portion 87, the large-diameter portion 87 is movable relative to the main wire 86.

The fixed elements 89 are immovably (i.e., fixedly) swaged on portions of the main wire 86 adjacent the opposite ends 87a and 87b of the large-diameter portion 87. The inner fixed element 89 (i.e., one of the fixed element 89 located more inward in the vehicle width direction than the other (outer fixed element 89) is fixed in such a manner that it can abut against the inner end 87a of the large-diameter portion 87, and the outer fixed element 89 is fixed in such a manner that it can abut against the outer end 87b of the large-diameter portion 87. Thus, the large-diameter portion 87 is kept disposed on the spaced position 86a by means of the pair of fixed elements 89. Each of the fixed elements 89 is smaller in axial length, along the longitudinal direction, than the large-diameter portion 87.

The large-diameter portion 87 (i.e., the front wire member 85) is accommodated in the connecting bag part 79. As noted above, the connecting bag part 79 is provided on a position vertically overlapping the front end portion 58a of the reinforcing bar 58. Thus, the large-diameter portion 87 is controlled to be disposed at a desired mounting position (i.e., beneath the front end portion 58a of the left reinforcing bar 58), by being disposed on the spaced position 86a.

Further, the left reinforcing bar 58 is a high-rigid member, and thus, with the large-diameter portion 87 disposed beneath the front end portion 58a of the left reinforcing bar 58 and with a bottom portion 79c of the connecting bag part 79 pressed downward by the large-diameter portion 87, downward pressing force applied by the large-diameter portion 87 can be transmitted efficiently to the front end portion 58a. Thus, the left reinforcing bar 58 can be reliably pressed toward the roof opening section 23 by the downward pressing force applied by the large-diameter portion 87. In this manner, it is possible to prevent unwanted uplift of the soft top 30 and thereby achieve an enhanced stability of the soft top 30.

Furthermore, by the large-diameter portion 87 being disposed beneath the front end portion 58a of the left reinforcing bar 58, the large-diameter portion 87 can be provided at generally the same position as the front end portion 58a of the left reinforcing bar 58. In this manner, the soft top 30 can have a wide easy-to-roll area outside the reinforcing bars 59, so that the soft top 30 can be readily folded into a compact size.

Further, as shown in FIG. 6, the fixed elements 89 are provided on the small-diameter portion 86b in such a manner that a distance L2 between the fixed elements 89 is greater than a length L3 of the large-diameter portion 87. Thus, the large-diameter portion 87 is movable relative to the main wire 86 between the fixed elements 89. In this way, axial extension of the large-diameter portion 87 due to thermal expansion is permitted without being hampered by the fixed elements 89.

Furthermore, with the distance L2 between the fixed elements 89 greater than the length L3 of the large-diameter portion 87, elastic deformation of the large-diameter portion 87 is permitted without being hampered by the pair of fixed elements 89. As a result, the instant embodiment can achieve an enhanced bendability of the front wire member 85 and thereby allows the soft top 30 to be folded with an increased ease.

As set forth above, the front wire member 85 includes the main wire 86, the left and right cylindrical members 87 and 88 and the fixed elements 89, and the left and right cylindrical members 87 and 88 each constituting the large-diameter portion. Thus, the main wire 86 can have a uniform cross section like the conventionally-known wires, and thus, any one of the conventionally-known wires can be used as the main wire 86. In this way, the main wire 86 can be formed with ease and enhanced productivity.

Further, as shown in FIGS. 9 and 10, the front wire member 85 is accommodated in the interior 82 of the connecting bag part 79 with the main wire 86 extending in the A-A direction (vehicle width direction). In this condition, the main wire 86, the large-diameter portions 87 and the fixed elements 89 are kept in contact, from above, with the bottom portion 79c of the connecting bag part 79. Namely, the front wire member 85 is connected to the front reinforcing member 54 and the front end 52e of the sheet 52 via the connecting bag part 79.

Further, the main wire 86 has a left end portion 86c connected to a front end portion of the left side rail 51 and a right end portion 86d connected to a front end portion of the right side rail 51. A tension-adjusting turnbuckle (not shown) is connected to one of the left end portion 86c and the right end portion 86d, so that manipulating the turnbuckle can appropriately adjust the tension of the front wire member 85. Thus, the main wire 86, the large-diameter portions and the fixed elements 89 are kept in contact, from above, with the bottom portion 79c of the connecting bag part 79 with the tension of the main wire 86 adjusted appropriately.

Further, as shown in FIGS. 6 and 8, the tension of the main wire 86 acts on the bottom portion 79c of the connecting bag part 79, so that the downward pressing force F3 acts on the bottom portion 79c of the connecting bag part 79 via the main wire 86, the large-diameter portion 87 and the pair of fixed elements 89 (namely, via the front wire member 85). With the downward pressing force F3 acting on the bottom portion 79c of the connecting bag part 79 like this, the front end portion 52e of the sheet 52 is pressed by the front wire member 85 downward toward the front seal member 27 (i.e., toward the passenger compartment 71) together with the front reinforcing member 54.

Thus, the lower surface 54f of the front end 54a of the front reinforcing member 54 is abutted, from an upper rear direction, against the upper portion 35a of the first seal section 35 and the upper surface 36a of the first stopper section 36 via the lower bead portion 68 of the front bead 66. In other words, the front edge portion 31a of the soft top 30 (more specifically, the front pressed end section 31) is abutted, from an upper rear direction, against the upper portion 35a of the first seal section 35 and the upper surface 36a of the first stopper section 36. The upper surface 36a of the first stopper section 36 is formed to extend flat along the front edge portion 31a of the front pressed end section 31 (e.g., the lower bead portion 68 of the front bead 66 and the front end 54a of the front reinforcing member 54).

The lower surface 54f of the rear end 54b of the front reinforcing member 54 is abutted, from above, against the upper portion 38a of the second seal section 38 and the upper surface 39a of the second stopper section 39 via the rear joint portion 78. In other words, the front pressed end section 31 of the soft top 30 is abutted, from above, against the upper portion 38a of the second seal section 38 and the upper surface 39a of the second stopper section 39. The upper surface 39a of the second stopper section 39 is formed to extend flat along the front pressed end section 31 (e.g., the rear joint portion 78 of the front connection section 62 and the rear end 54b of the front reinforcing member 54).

Because the upper portion 35a of the first seal section 35 is located above the upper surface 36a of the first stopper section 36 as noted above (see FIG. 7), it is deformed by being pressed downward by the front edge portion 31a of the front pressed end section 31 (more specifically, by the lower bead portion 68 of the front bead 66). In this manner, tight sealing can be secured between the front edge portion 31a of the front pressed end section 31 (i.e., the front end 54a of the front reinforcing member 54) and the first seal section 35.

In this condition, the front end 54a of the front reinforcing member 54 is abutted, from above, against the upper surface 36a of the first stopper section 36 via the lower bead portion 68 of the front bead 66. Namely, the front edge portion 31a of the front pressed end section 31 is abutted, from above, against the upper surface 36a of the first stopper section 36.

Further, the upper portion 38a of the second seal section 38 is located above the upper surface 39a of the second stopper section 39 (see FIG. 7), it is deformed by being pressed downward by the front pressed end section 31 (more specifically, by the rear joint portion 78). In this manner, tight sealing can be secured between the front pressed end section 31 (i.e., the rear end 54b of the front reinforcing member 54) and the second seal section 38.

In this condition, the rear end 54b of the front reinforcing member 54 is abutted, from above, against the upper surface 39a of the second stopper section 39 via the lower bead portion 68 of the front bead 66. Namely, the front pressed end section 31 is abutted, from above, against the upper surface 39a of the second stopper section 39.

Further, the upper surface 36a of the first stopper section 36 and the upper surface 39a of the second stopper section 39 are formed to extend obliquely upward and flat along the front end 54a and rear end 54b of the front reinforcing member 54 (i.e., along the front pressed end section 31). Thus, the front reinforcing member 54 is supported along the horizontal direction by the upper surface 36a of the first stopper section 36 and the upper surface 39a of the second stopper section 39. Consequently, the upper portion 35a of the first seal section 35 and the upper portion 38a of the second seal section 38 are pressed downward substantially uniformly.

In this manner, it is possible to present only one of the first and second seal sections 35 and 38 from being greatly deformed so that the front reinforcing member 54 inclines with respect to the horizontal direction. Thus, it is possible to prevent the pressing force of the front reinforcing member 54 from being biased toward only one of the first and second seal sections 35 and 38. In this way, tight sealing can be secured between the front end 54a of the front reinforcing member 54 and the first seal section 35 and between the rear end 54b of the front reinforcing member 54 and the second seal section 38.

Furthermore, in the instant embodiment, the front wire member 85 is provided in a space 96 between the first seal unit 34 and the second seal unit 37 and extends in the horizontal direction indicated by arrow B-B perpendicularly intersecting the extending direction (indicated by arrow A-A). Thus, the pressing force F3 of the front wire member 85 acts from the front reinforcing member 34 on the first seal unit 34 and the second seal unit 37 as downward pressing force.

Further, by the front wire member 85 being provided between the first seal unit 34 and the second seal unit 37, it is possible to reduce both a distance between the first seal unit 34 and the front wire member 85 and a distance between the second seal unit 37 and the front wire member 85. Thus, the pressing force F3 of the front wire member 85 can be transmitted efficiently from the front reinforcing member 54 to both of the first seal unit 34 (first seal section 35 and first stopper section 36) and the second seal unit 37 (second seal section 38 and second stopper section 39).

In determining a position where the front wire member 85 should be disposed, it is sometimes conceivable to position the front wire member 85 outwardly, in the vehicle body front-rear direction, of any one of the first and second stopper sections 36 and 39. In such a case, the pressing force of the front wire member 85 acts on the front reinforcing member 54 at a position outward of the one stopper section. Namely, the pressing force of the front wire member 85 acts on the front reinforcing member 54 as force that pivots the front reinforcing member 54 about the one stopper section away from the other stopper section, so that it becomes difficult to keep at an appropriate level the pressing force of the front reinforcing member 54 acting on the other stopper section.

Therefore, in the instant embodiment, the front wire member 85 is provided between the first stopper section 36 and the second stopper section 36, so that the pressing force F3 of the front wire member 85 can be transmitted efficiently from the front reinforcing member 54 to both of the first seal unit 34 (first seal section 35 and first stopper section 36) and the second seal unit 37 (second seal section 38 and second stopper section 39).

Furthermore, the front wire member 85 is connected to the substantial middle portion 54g of the front reinforcing member 54 via the connecting bag part 79, so that the pressing force F3 of the front wire member 85 is transmitted to the substantial middle portion 54g and then to the front end 54a and the rear end 54b substantially uniformly or evenly. Thus, the pressing force F1 of the front end 54a acting on the first seal unit 34 (particularly, the first seal section 35) and the pressing force F2 of the rear end 54b acting on the second seal unit 37 (particularly, the second seal section 38) can be secured substantially evenly. In other words, the pressing force F1 and the pressing force F2 of the front reinforcing member 54 acting on the first seal section 35 and the second seal section 38 can be secured substantially evenly.

The soft top 30 (i.e., the front reinforcing member 54) duly attached to the roof opening section 23 (see FIG. 1) may undesirably move (or displaced) in a horizontal direction, such as the vehicle body front-rear direction (i.e., arrow B-B direction) and/or the vehicle width direction (i.e., arrow A-A direction). Thus, in the instant embodiment, the front reinforcing member 54 is abutted, from above, against both of the first seal unit 34 and the second seal unit 37, with a view to addressing such displacement. Further, the front wire member 85 is connected to the front reinforcing member 54 so that the front pressed end section 31 of the soft top 30 can be pressed by the downward pressing force F3 of the front wire member 85 downward together with the front reinforcing member 54.

Thus, even when the soft top 30 (i.e., the front reinforcing member 54) has moved (or has been displaced) in a horizontal direction, the front end 54a of the front reinforcing member 54 can be kept appropriately abutted against the first seal unit 34 (first seal section 35); similarly, the rear end 54b of the front reinforcing member 54 can be kept appropriately abutted against the second seal unit 37 (second seal section 38). Namely, the front and rear ends 54a and 54b of the front reinforcing member 54 can be kept appropriately abutted against both of the first and second seal sections 35 and 38. In this way, the pressing force F1 and F2 of the front reinforcing member 54 acting on the first and second seal sections 35 and 38 can be kept appropriate, so that tight sealing of the soft top 30 relative to the first and second seal sections 35 and 38 can be kept in an enhanced state.

Furthermore, the upper surface 36a of the first stopper section 36 of the first seal unit 34 and the upper surface 39a of the second stopper section 39 of the second seal unit 37 are both formed flat, and thus, even when the soft top 30 (i.e., the front reinforcing member 54) has been displaced in a horizontal direction, the front reinforcing member 54 can be kept supported in a stable state.

Figure 11:
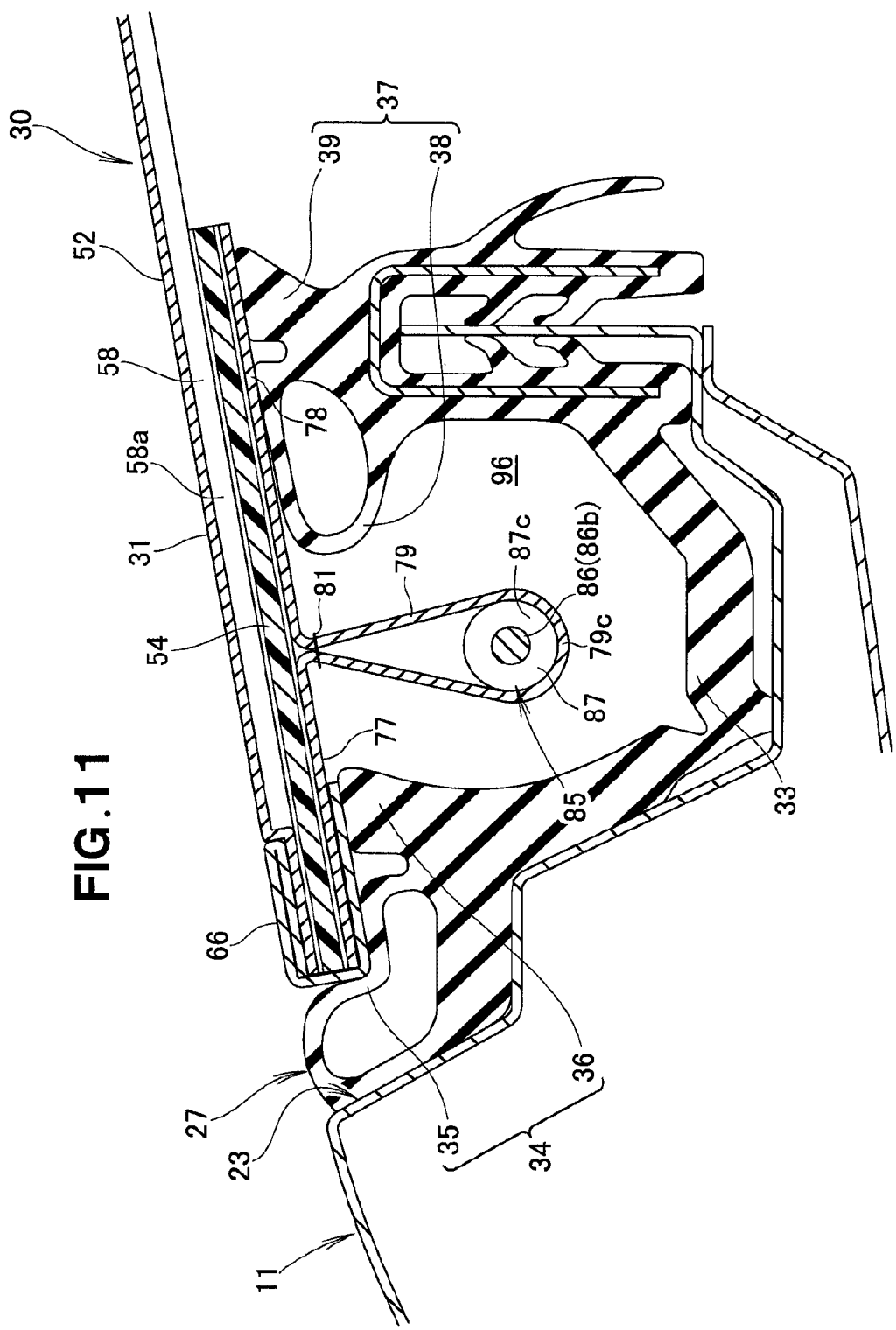
FIG. 11 is a sectional view taken along the 11-11 line of FIG. 1 near the left side of a large-diameter portion.

Further, as shown in FIGS. 9 and 11, the large-diameter portion 87 is disposed on the spaced position 86a of the front wire member 85 that is spaced from the left side rail 51, and the large-diameter portion 87 is greater in diameter than the small-diameter portion 86b (see FIG. 6). Thus, with the soft top 30 attached to the vehicle body 11, the large-diameter portion 87 largely bulges downward beyond the small-diameter portion 86b, so that the large-diameter portion 87 is pressed strongly against the bottom portion 79c of the connecting bag part 79.

By the large-diameter portion 87 being pressed strongly against the bottom portion 79c like this, the front pressed end section 31 of the soft top 30 is pressed downward appropriately by the front wire member 85 (particularly, by the large-diameter portion 87). Thus, the front pressed end section 31 of the soft top 30 can be pressed appropriately against the front seal member 27 of the roof opening section 23, with the result that sealing performance of the front pressed end section 31 relative to the front seal member 27 can be kept in an appropriate state.

The large-diameter portion 87 is elastically deformable. Thus, with the small-diameter portion 86b held in contact with the bottom portion 79c of the connecting bag part 79, the large-diameter portion 87 (particularly the lower end portion 87c) is elastically deformed to be compressed, so that the lower end portion 87c contacts the bottom portion 79c of the connecting bag part 79. Thus, the bottom portion 79c of the connecting bag part 79 is pressed downward by the elasticity (i.e., restoring force from the compressed state) of the large-diameter portion 87 as well as the pressing force of the main wire 86. In this manner, the bottom portion 79c of the connecting bag part 79 is pressed downward by great force, so that the sealing performance of the front pressed end section 31 relative to the front seal member 27 can be kept in an even more appropriate state.

Because the large-diameter portion 87 is disposed only on the spaced position 86a of the front wire member 85 that is spaced from the left side rail 51, the other portion of the front wire member 85 than the large-diameter portion 87, or the remaining portion of the front wire member 85 is formed as the small-diameter portion 86b. The small-diameter portion 86b smaller in diameter than the large-diameter portion 87 is formed to be roll-folded with ease. Thus, operation for folding the front wire member 85 into a rolled configuration can be facilitated, with the result that the soft top 30 can be folded with an increased ease.

Furthermore, because the large-diameter portion 87 formed of an elastic material is elastically deformable, it is possible to reduce a bending difficulty, i.e. increase bendability, of the front wire member 85, so that the front wire member 85 can be roll-folded with an increased ease when the soft top 30 is to be folded.

In addition, the large-diameter portion 87 is movable relative to the main wire member 86, and thus, when the large-diameter portion 87 is to be elastically deformed, the desired elastic deformation can be prevented from being hampered by the main wire 86. Thus, bendability of the front wire member 85 can be increased, which allows the soft top 30 to be folded with an increased ease.

The rear wire member (not shown) is similar in construction and operation to the front wire member 85 and thus will not be described in detail to avoid unnecessary duplication. The rear end portion 52f of the sheet 52 is pressed by the rear wire member downward toward the rear seal member (i.e., toward the passenger compartment 71 (see FIG. 8)) together with the rear reinforcing member 55 shown in FIG. 3. Thus, with the left and right side rails 51 mounted to the roof opening section 23, the front edge portion 52c of the sheet 52 extends along the front opening edge portion 24, while the rear edge portion 52c of the sheet 52 extends along the rear opening edge portion 25.

Figure 12:
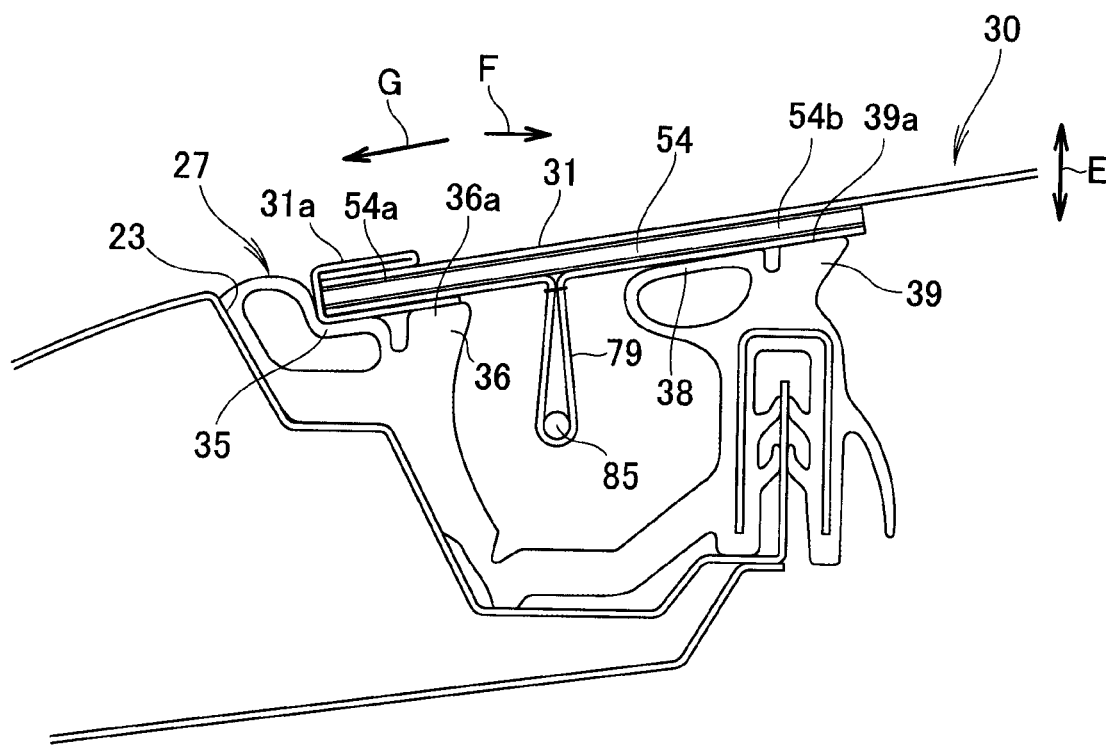
FIG. 12 is a view explanatory of an example manner in which tight sealing between the front seal member and the soft top is secured by first and second stopper sections.

The following describe, with reference to FIG. 12, an example manner in which tight sealing between the front seal member 27 and the soft top 30 is secured by the first and second stopper sections 36 and 39.

Because the sheet 52 of the soft top 30 is formed of flexible canvas, flexure may occur in a middle portion, in the vehicle body front-rear direction, of the soft top 30 as indicated by arrow E. If such flexure has occurred, the front pressed end section 31 of the soft top 30 is pulled toward the rear of the vehicle body (toward inside the roof opening section 23) as indicated by arrow F.

Thus, in the instant embodiment, the second stopper section 39 is disposed above the first stopper section 36, and the upper surfaces 36a and 39a of the first and second stopper sections 36 and 39 are slanted downward toward outside the roof opening section 23 (i.e., toward the front of the vehicle body). Thus, the front edge portion 31a of the front pressed end section 31 can be appropriately moved, by the own weight of the soft top 30 and the downward tension of the front wire member 85, toward the first seal section 35 as indicated by arrow G. Thus, the front pressed end section 31 of the soft top 30 can be held at a predetermined mounting position against the downward pulling force F produced in the front pressed end section 31. In this way, tight sealing between the first seal section 35 and the front edge portion 31a of the front pressed end section 31 can be secured.

Note that, if the soft top 30 is replaced with a roof glass or metal panel of high rigidity, an amount of flexure occurring in the middle portion, in the vehicle body front-rear direction, of the soft panel can be reduced. Thus, in such a case, tight sealing between the first seal section 35 and the front edge portion 31a of the front pressed end section 31 can be secured without the second stopper section 39 being disposed above the upper surface 36a of the first stopper section 36 and without the upper surfaces 36a and 39a of the first and second stopper sections 36 and 39 being slanted downward.

Further, the front pressed end section 31 can be supported stably by the front pressed end section 31 being abutted against both of the upper surfaces 36a and 39a of the first and second stopper sections 36 and 39. Furthermore, the front pressed end section 31 is supported by the first stopper section 36 adjoining the first seal section 35 and by the second stopper section 39 adjoining the second seal section 38. Thus, it is possible to prevent the front pressed end section 31 flexing vertically or in the up-down direction at the positions of the first seal section 35 and the second seal section 38. By thus preventing inclination and flexure of the front pressed end section 31, the instant embodiment can secure tight sealing between the first seal section 35 and the front edge portion 31a of the front pressed end section 31 and between the second seal section 38 and the front pressed end section 31.

The following describe, with reference to FIG. 13, an example manner in which tight sealing between the front seal member 27 and the soft top 30 is secured by the front reinforcing member 54.

As shown in FIG. 13A, the front reinforcing member 54 is supported generally along the horizontal direction by the upper surfaces 36a and 39a of the first and second stopper sections 36 and 39, which can secure tight sealing between the front end 54a of the front reinforcing member 54 and the first seal section 35 and between the rear end 54b of the front reinforcing member 54 and the second seal section 38.

Further, the front reinforcing member 54 is abutted, from above, against the first and second seal sections 35 and 38 with the front reinforcing member 54 held generally in the horizontal direction by being supported on the upper surfaces 36a and 39a of the first and second stopper sections 36 and 39. Thus, even when the soft top 30 has been displaced in a horizontal direction (e.g., in the vehicle body front-rear direction (i.e., arrow H direction) or vehicle width direction), the front reinforcing member 54 can be kept supported generally along the horizontal direction.

In this manner, pressing force F4 acting from the front end 54a of the front reinforcing member 54 on the first seal section 35 can be kept appropriate, and similarly, pressing force F5 acting from the rear end 54b of the front reinforcing member 54 on the second seal section 38 can be kept appropriate. In this way, tight sealing between the front seal member 27 and the front pressed end section 31 of the soft top 30 can be kept appropriate, with the result that tight sealing between the front opening edge portion 24 and the front pressed end section 31 can be kept appropriate.

Generally, during travel of the vehicle, negative pressure is produced over the soft top 30 by travel wind flowing as indicated by arrow I, so that upward lifting force F6 would act on the soft top 30. To address such an inconvenience, only the front edge portion 52c of the sheet 52 in the instant embodiment is joined (sewn) to the front end 54a of the front reinforcing member 54; that is, the sheet 52 is not joined (sewn) to the other portion 54h of the front reinforcing member 54 (i.e. the other portion 54h rearward, in the vehicle body front-rear direction, of the front end 54a).

Thus, when the upward lifting force F6 has acted on the soft top 30, the sheet 52 is allowed to escape upward from the other portion 54h of the front reinforcing member 54. Thus, it is possible to reliably prevent the front reinforcing member 54 from being pushed by the upward lifting force F6 upward from the front seal member 27 (the first and second seal units 34 and 37). Thus, even when the upward lifting force F6 has acted on the soft top 30 due to travel wind and/or the like, the tight sealing between the front seal member 27 and the front pressed end section 31 of the soft top 30 can be kept appropriate, with the result that the sealing between the opening edge section 24 and the front pressed end section 31 can be kept appropriate.

Figure 14:
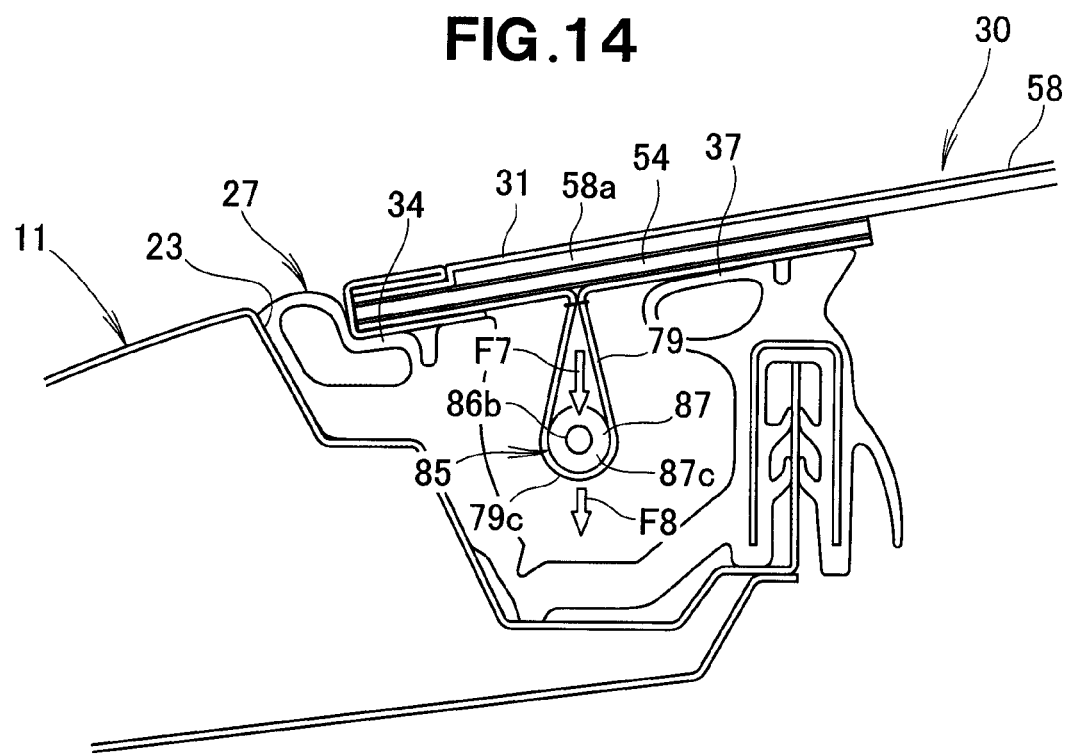
FIG. 14 is a view explanatory of an example manner in which the soft top is pressed downward by the large-diameter portion of the front wire member.

The following describe, with reference to FIG. 14, an example manner in which the soft top 30 is pressed downward by the large-diameter portion 87 of the front wire member 85.

With the soft top 30 attached to the vehicle body 11, as shown in FIG. 14, the large-diameter portion 87 largely bulges downward beyond the small-diameter portion 86b. Thus, the large-diameter portion 87 is pressed strongly against the bottom portion 79c of the connecting bag part 79, so that the front pressed end section 31 of the soft top 30 can be appropriately pressed downward.

Further, with the small-diameter portion 86b held in contact with the bottom portion 79c of the connecting bag part 79, the large-diameter portion 87 (particularly the lower end portion 87c) is elastically deformed to be compressed, so that the lower end portion 87c contacts the bottom portion 79c of the connecting bag part 79. Thus, the bottom portion 79c of the connecting bag part 79 is pressed downward by elastic force F8 (i.e., restoring force from the compressed state) of the large-diameter portion 87 in addition to pressing force F7 of the main wire 86. In this way, the front pressed end section 31 can be pressed downward appropriately.

Further, the large-diameter portion 87 is disposed beneath the front end portion 58a of the left reinforcing bar 58, and thus, the downward pressing force of the large-diameter portion 87 can be received by the front end portion 58a of the left reinforcing bar 58. The left reinforcing bar 58 is a member of high rigidity. Thus, by the front end portion 58a of the left reinforcing bar 58 receiving the downward pressing force of the large-diameter portion 87, the pressing force can be transmitted efficiently to the front pressed end section 31.

By the front pressed end section 31 being pressed downward appropriately as above, the soft top 30 can be prevented from being lifted upward from the front seal member 27 during travel of the vehicle. In this way, tight sealing of the soft top 30 relative to the front seal member 27 can be secured.

Figure 15A:
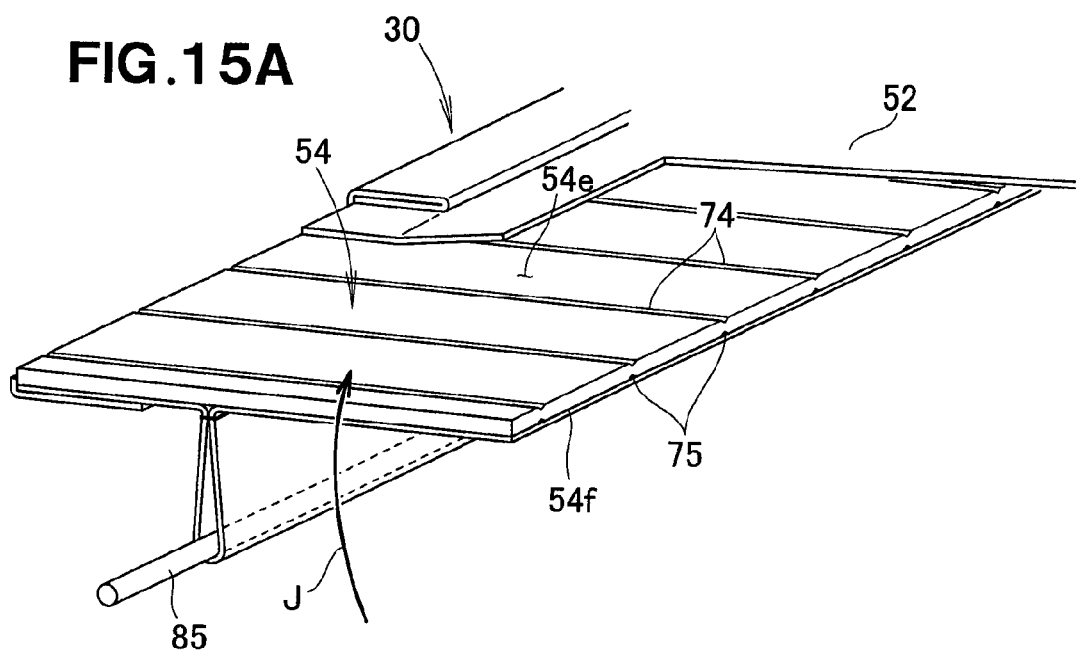
FIGS. 15A and 15B are views explanatory of an example manner in which the soft top is roll-folded starting with left and right side rails.
Figure 15B:
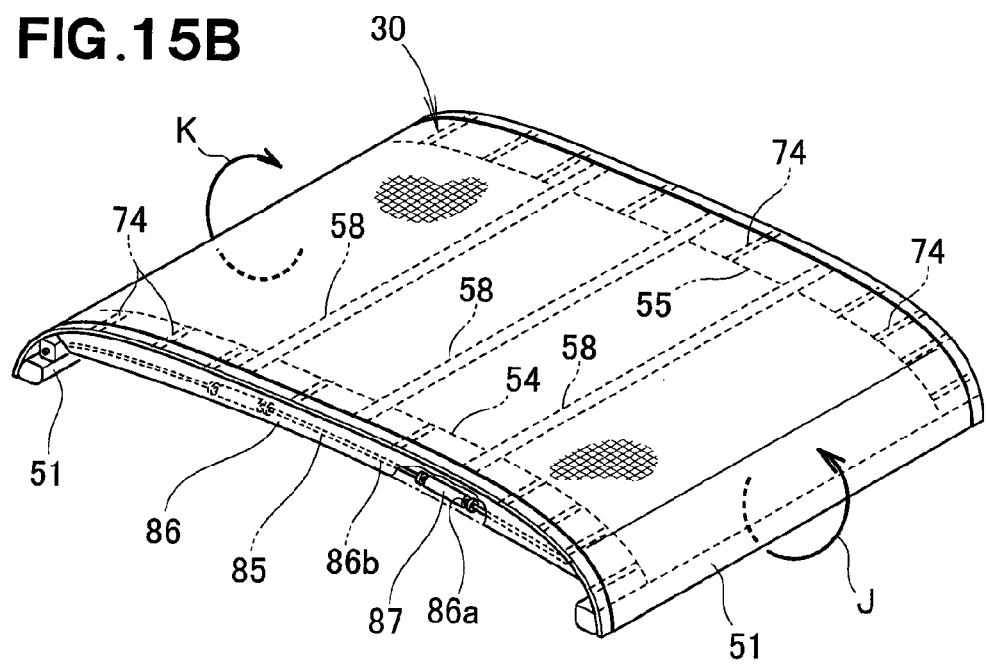
Figure 16:
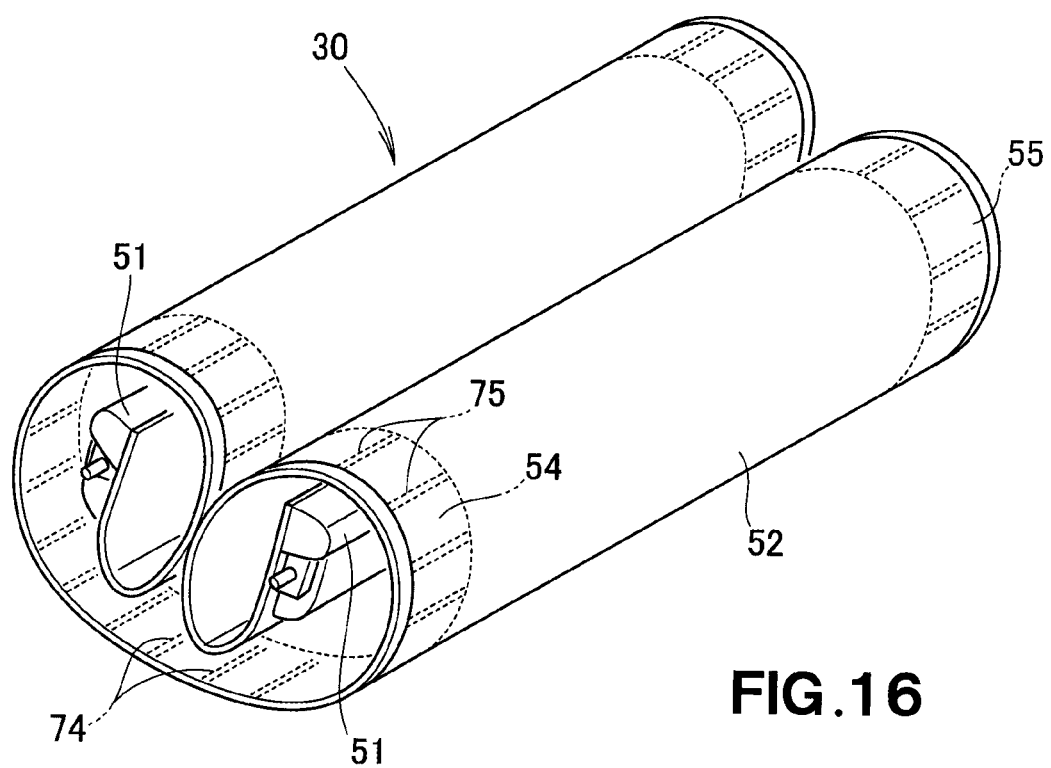
FIG. 16 is a view showing the soft top in a folded state.

Further, the following describe, with reference to FIGS. 2, 15 and 16, an example manner in which the soft top 30 is folded into a compact size. For ease of understanding, only the left large-diameter portion 87 will be shown and described in FIG. 15B with illustration of the right large-size portion omitted.

First, the soft top 30 is removed from the roof opening section 23, as shown in FIG. 2. Then, of the soft top 30 removed from the roof opening section 23, the front reinforcing member 54 is roll-folded as indicated by arrow J in. 15(A) by being bent at the upper and lower groove portions 74 and 75. Simultaneously, the rear reinforcing member 55 is roll-folded as indicated by arrow J in. 15(B), similarly to the front reinforcing member 54.

More specifically, the soft top 30 is roll-folded from the left side rail 51 as indicated by arrow J by the front and rear reinforcing members 54 and 55 being roll-folded from their respective left sides. Similarly, the soft top 30 is roll-folded from the right side rail 52 as indicated by arrow K by the front and rear reinforcing members 54 and 55 being roll-folded from their respective right sides. By the soft top 30 being roll-folded from the left and right side rails 51, the front wire member 85 (see FIG. 13) and the rear wire member are roll-folded together with the soft top 30.

Because the large-diameter portion 87 is provided only on the spaced position 86a of the front wire member 85 that is spaced from the left side rail 51, the other portion of the front wire member 85 can be formed as the small-diameter portion 86b. The small-diameter portion 86b is in the form of a wire smaller in diameter than the large-diameter portion 87 and formed to be capable of being roll-folded easily than the large-diameter portion 87.

Furthermore, elastic deformation of the large-diameter portion 87 can reduce the bending difficulty, i.e. increase the bendability, of the front wire member 85, so that the front wire member 85 can be roll-folded with an increased ease. In addition, the large-diameter portion 87 is movable relative to the main wire 86, and thus, as the large-diameter portion 87 is elastically deformed, the desired elastic deformation can be prevented from being hampered by the main wire 86. Thus, the operation for folding the front wire member 85 into a rolled configuration can be facilitated, with the result that the soft top 30 can be folded with an increased ease.

Further, the soft top 30 includes the plurality of reinforcing bars 58, and thus, when the soft top 30 is to be folded, the reinforcing bars 58 can become portions where the soft top 30 is hard to fold. Therefore, in the instant embodiment, the large-diameter portion 87 is provided at a position vertically overlapping (or at the same position in the extending direction of the wire member 85) the front end portion 58a of the left reinforcing bar 58. Thus, it is possible to secure a wide area outside the reinforcing bars 58, i.e. a wide area easy to fold in a rolled configuration. In this way, the soft top 30 can be folded compact and thus can be stored with an increased efficiency.

Furthermore, in the instant embodiment, the aforementioned front and rear reinforcing members 54 and 55 are not provided near the left and right side rails 51. Thus, the soft top 30 can be rolled with an increased ease and thus can be folded with an increased ease.

When the soft top 30 is to be roll-folded, the front wire member 85 (see FIG. 13) is rolled outwardly upward of the front reinforcing member while the rear wire member is rolled outwardly upward of the rear reinforcing member 55. Further, the front wire member 85 has generally the same length as the front reinforcing member 54, and the rear wire member 85 has generally the same length as the rear reinforcing member 55.

Thus, as the soft top 30 is roll-folded, outer peripheral regions of the front reinforcing member 54 and the rear reinforcing member 55 are restricted by the front wire member 85 and the rear wire member, and thus, the front reinforcing member 54 and the rear reinforcing member 55 are folded in such a manner as to sag inwardly. After the inward sagging of the front and rear reinforcing members 54 and 55, the soft top 30 is further rolled in such a manner that the front and rear reinforcing members 54 and 55 are bent (bent back) outwardly toward the front wire member 85 and the rear wire member.

Because the upper and lower groove portions 74 and 75 are formed in each of the front and rear reinforcing members 54 and 55, the aforementioned inward sagging and outward bending of the front and rear reinforcing members 54 and 55 can be facilitated, with the result that the soft top 30 can be rolled even more easily and thus can be folded even more easily.

The soft top 30 is folded compactly by being roll-folded staring with the left and right side rails 51, as shown in FIG. 16. The soft top 30 folded in this manner can be readily stored into a storage section or space of the vehicle body. In addition, because the soft top 30 can be folded compact, the storage space for storing the folded soft top 30 can be reduced in size.

Referring back to FIG. 15A, because the upper groove portions 74 are formed in the upper surface 54e of the front reinforcing member 54 while the lower groove portions 75 are formed in the lower surface 54f of the front reinforcing member 54, the front reinforcing member 54 can be bent at the upper and lower groove portions 74 and 75 in two directions: the direction of arrow J; and a direction opposite the arrow J direction, i.e. upward and downward directions. In this way, it is possible to enhance the operability in folding the soft top 30 into a compact size.

It should be appreciated that the detachable-roof-equipped vehicle body structure of the present invention is not limited to the above-described embodiment and can be modified variously. For example, whereas the embodiment of the detachable-roof-equipped vehicle body structure has been described above in relation to the case where various members, such as the sheet 52, the front reinforcing member 54, the rear reinforcing member 55, the front connection section 62 and the rear connection section, are joined together by sewing, the present invention is not so limited, and the various members may be joined together by any other suitable means, such as an adhesive agent or rivets.

Further, whereas the embodiment of the detachable-roof-equipped vehicle body structure has been described above in relation to the case where the reinforcing member 54 has the upper and lower groove portions 74 and 75 as the groove sections 73, the present invention is not so limited, and the reinforcing member 54 may have only the upper groove portions 74 or the lower groove portions 75.

Furthermore, whereas the embodiment of the detachable-roof-equipped vehicle body structure has been described above in relation to the case where the upper and lower groove portions 74 and 75 formed in the front reinforcing member 54 each have the groove depth D1 that is uniform from the front end 54*a* to the rear end 54*b*, the upper and lower groove portions 74 and 75 may be formed in such a manner that the groove depth D1 gradually increase or decrease between the front end 54*a* and the rear end 54*b*. In such a case too, unwanted deformation of the front reinforcing member 54 can be prevented and thus tight sealing of the soft top 30 relative to the first and second seal sections 35 and 38 can be secured, as in the above-described embodiment.

Furthermore, whereas the embodiment of the detachable-roof-equipped vehicle body structure has been described above in relation to the case where the front opening edge portion 24 of the roof opening section 23, the front pressed end section 31 of the soft top 30, etc. are curved toward the front of the vehicle body, the present invention is not so limited, and the front opening edge portion 24, the front pressed end section 31, etc. may be formed to extend straight in the vehicle width direction.

Furthermore, whereas the embodiment of the detachable-roof-equipped vehicle body structure has been described above in relation to the case where the first seal unit 34 includes the first seal section 35 and the first stopper section 36 and the second seal unit 37 includes the second seal section 38 and the second stopper section 39, the present invention is not so limited, and the first seal unit 34 may include only the first seal section 35 and the second seal unit 37 may include only the second seal section 38. In such a case, the front wire member 85 is provided between the first and second seal sections 35 and 38, so that a distance between the first seal section 35 and the front wire member 85 and a distance between the second seal section 35 and the front wire member 85 can be reduced. In this way, the pressing force of the front wire member 85 can be transmitted efficiently from the front reinforcing member 54 to both of the first and second seal sections 35 and 38.

In determining a disposed position of the front wire member 85, it is sometimes conceivable to dispose the front wire member 85 outwardly, in the vehicle body front-rear direction, of any one of the first and second seal sections 35 and 38. In such a case, the pressing force of the front wire member 85 acts on the front reinforcing member 54 at a position outward of the one seal section. Namely, the pressing force of the front wire member 85 acts on the front reinforcing member 54 as force that pivots the front reinforcing member 54 about the one seal section away from the other stopper section, so that it becomes difficult to keep at an appropriate level the pressing force of the front reinforcing member 54 acting on the other stopper section. The aforementioned modification where the front wire member 85 is provided between the first and second seal sections 35 and 38 can avoid such an inconvenience and thereby allows the pressing force of the front wire member 85 to be transmitted efficiently from the front reinforcing member 54 to both of the first and second seal sections 35 and 38.

Furthermore, whereas the embodiment of the detachable-roof-equipped vehicle body structure has been described above in relation to the case where the left and right cylindrical members 87 and 88 are provided as large-diameter portions of the front wire member 85, the present invention is not so limited, and three or more cylindrical members may be provided as large-diameter portions of the front wire member 85.

Moreover, the shapes and constructions of the vehicle body, roof opening section, front and rear opening edge portions, front and rear seal members, soft top, first and second seal units, first and second seal sections, sheet, front and rear reinforcing members, groove section (upper and lower groove portions), connecting bag part, front and rear wire members, left and right side rails, reinforcing bars, main wire, left and right cylindrical members (large-diameter portions), fixed elements, etc. in the detachable-roof-equipped vehicle body structure are not limited to those described above in relation to the embodiment and may be modified as appropriate.

Finally, it should be appreciated that the basic principles of the present invention are well suited for application to automobiles including a detachable-roof-equipped vehicle body structure where a soft top is detachably attached to a roof opening section of the vehicle body to close the roof opening section.

What is claimed is:

1. A detachable-roof-equipped vehicle body structure comprising:
   a roof opening section provided in a roof of a vehicle body;
   a soft top constructed to be detachably attached to the roof opening section for closing the roof opening section;
   a wire member provided on the soft top for pressing downward a depressed end section of the soft top along the roof opening section; and
   a seal member provided on an opening edge portion of the roof opening section for abutting against the depressed end section of the soft top, the seal member including a first seal section and a second seal section spaced from each other in a horizontal direction perpendicular to an extending direction of the wire member,
   the soft top including:
      a flexible sheet constructed to cover the roof opening section;
      a reinforcing member formed of a material of higher rigidity than the sheet and provided on a side of the sheet closer to a passenger compartment; and
      a connection section connecting the wire member to the reinforcing member,
      the reinforcing member being abutted, from above, against both of the first and second seals.

2. The detachable-roof-equipped vehicle body structure according to claim 1, wherein the reinforcing member includes a groove section formed therein to extend, along the horizontal direction where the first seal section and the second seal section are spaced from each other, from one end of the reinforcing member that is located adjacent the first seal section to another end of the reinforcing member that is located adjacent to the second seal section.

3. The detachable-roof-equipped vehicle body structure according to claim 2, wherein the groove section includes an upper groove portion formed in an upper surface of the reinforcing member, and a lower groove portion formed in a lower surface of the reinforcing member.

4. The detachable-roof-equipped vehicle body structure according to claim 3, wherein the upper groove portion and the lower groove portion are formed in positions of the reinforcing member that vertically overlap each other.

5. The detachable-roof-equipped vehicle body structure according to claim 4, wherein the wire member is provided between the first seal section and the second seal section.

6. The detachable-roof-equipped vehicle body structure according to claim 5, wherein the connection section is connected to a substantial middle position, in the horizontal direction perpendicular to the extending direction of the wire member, of the reinforcing member.

7. A detachable-roof-equipped vehicle body structure comprising:
   a roof opening section provided in a roof of a vehicle body; and
   a flexible soft top constructed to be detachably attached to the roof opening section for closing the roof opening section,
   the soft top including:
      a flexible sheet;
      a connecting bag part provided on the sheet;
      mounting members provided on opposite sides of the sheet and constructed to be mounted on the vehicle body; and
      a wire member inserted through the connecting bag part and extending between the mounting members, the wire member including at least two large-diameter portions each provided on a spaced position of the wire member that is spaced from one of the mounting members, each of the large-diameter portions having a larger diameter than a remaining portion of the wire member.

8. The detachable-roof-equipped vehicle body structure according to claim 7, wherein the wire member includes a main wire having a substantially uniform cross section and cylindrical members having the main wire inserted therethrough, and wherein the cylindrical members constitute the large-diameter portions.

9. The detachable-roof-equipped vehicle body structure according to claim 8, wherein the cylindrical members are each formed of an elastic material.

10. The detachable-roof-equipped vehicle body structure according to claim 9, wherein each of the cylindrical members having the main wire inserted therethrough is movable relative to the main wire.

11. The detachable-roof-equipped vehicle body structure according to claim 10, wherein the wire member further includes at least pairs of fixed elements, each of the pairs of fixed elements being mounted immovably on the main wire adjacent to respective ones of opposite ends of a corresponding one of the cylindrical members in such a manner that the fixed elements are abuttable against the respective ones of opposite ends, and
   wherein, of each of the pairs, a distance between the fixed elements is greater than a length of the cylindrical member.

12. The detachable-roof-equipped vehicle body structure according to claim 7, wherein the soft top further includes a reinforcing bar provided between the mounting members and extending in a direction crossing an extending direction of the wire member, and
   wherein each of the large-diameter portions is disposed at a same position, in the extending direction of the wire member, as an end portion of the reinforcing bar.

13. The detachable-roof-equipped vehicle body structure according to claim 12, wherein the reinforcing bar is disposed in such a manner that a portion of thereof is located at a position overlapping the connecting bag part.

* * * * *